United States Patent
Beedu et al.

(10) Patent No.: US 11,853,177 B2
(45) Date of Patent: *Dec. 26, 2023

(54) GLOBAL ENTITY DISTRIBUTION

(71) Applicant: Nutanix, Inc., San Jose, CA (US)

(72) Inventors: Bharat Kumar Beedu, Bangalore (IN); Ganesh Sahukari, Kasibugga (IN); Nikhil Loya, Bengaluru (IN); Sharad Maheshwari, Benagaluru (IN)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,748

(22) Filed: Mar. 23, 2022

(65) Prior Publication Data

US 2022/0374322 A1    Nov. 24, 2022

Related U.S. Application Data

(63) Continuation of application No. 16/526,397, filed on Jul. 30, 2019, now Pat. No. 11,288,148.

(Continued)

(51) Int. Cl.
*G06F 11/20* (2006.01)
*H04L 67/1095* (2022.01)
(Continued)

(52) U.S. Cl.
CPC ...... *G06F 11/2076* (2013.01); *G06F 9/45533* (2013.01); *G06F 11/1464* (2013.01); *H04L 67/1095* (2013.01); *G06F 2009/45595* (2013.01)

(58) Field of Classification Search
CPC ............. G06F 11/2076; G06F 9/45533; G06F 11/1464; G06F 2009/45595; G06F 11/2097; G06F 11/2094; H04L 67/1095
See application file for complete search history.

(56) References Cited

U.S. PATENT DOCUMENTS 8,312,237 B2   11/2012   Koziy et al.
8,458,333 B1   6/2013    Stoica et al.
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Jason W Blust
(74) *Attorney, Agent, or Firm* — Vista IP Law Group, LLP

(57) ABSTRACT

Methods, systems and computer program products for data protection across computing infrastructure comprising a plurality of geographically distant computing clusters. The geographically distant computing clusters form a distributed system comprising clusters that are assigned into availability zones. Disaster recovery policies are maintained in each of the availability zones. A first cluster detects a modification of a disaster recovery policy. The modification of the disaster recovery policy that occurred at the first cluster is to be communicated over a wide area network. Synchronization of the disaster recovery policy is accomplished by carrying out a peer-to-peer communication protocol over the wide area network. The peer-to-peer communication protocol comprises issuing a first synchronization request message from a source peer, receiving the first synchronization request message at a remote peer, and issuing a synchronization response message by the remote peer, which in turn is transmitted over the wide area network to the source peer.

24 Claims, 14 Drawing Sheets

Related U.S. Application Data

(60) Provisional application No. 62/824,868, filed on Mar. 27, 2019.

(51) Int. Cl.
    *G06F 9/455*     (2018.01)
    *G06F 11/14*     (2006.01)

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 9,203,865 B2 | 12/2015 | Linden et al. |
| 9,430,484 B2 | 8/2016 | Kiselev et al. |
| 9,772,866 B1 | 9/2017 | Aron et al. |
| 2007/0245004 A1 | 10/2007 | Chess et al. |
| 2009/0172201 A1 | 7/2009 | Carmel |
| 2016/0087854 A1 | 3/2016 | Jayanti Venkata et al. |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/ (Publication date based on indicated capture date by Archive.org; first publication date unknown).
Cano, I. et al., "Curator: Self-Managing Storage for Enterprise Clusters", *14th USENIX Symposium on Networked Systems Design and Implementation, NSDI '17*, (Mar. 27, 2017).
Juniper Networks, "Junos Space Network Management Platform: High Availability and Disaster Recovery Guide", Juniper Networks, Inc., (Modified on Mar. 18, 2019).
IBM, "Data replication in a cluster", IBM Knowledge Center, (Jun. 17, 2018).
IBM, "High availability for the policy server", IBM Knowledge Center, (Jun. 17, 2018).
Cisco, "ACI Multi-Pod", White Paper, Cisco, (Updated on Mar. 16, 2020).
CISCO, "Cisco ACI Multi-Site Architecture", White Paper, Cisco, (Updated on Mar. 2, 2020).
Ardica, M., "Deployment Options for Interconnecting Multiple ACI Fabrics", Ciscolive!, (Jul. 10-14, 2016).
Non-Final Office Action for U.S. Appl. No. 16/526,397 dated Mar. 23, 2021.
Notice of Allowance for U.S. Appl. No. 16/526,397 dated Nov. 19, 2021.
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Condie, T., et al., "Adaptive Peer-to-Peer Topologies", 11 Pages, Stanford University, Stanford, California. Sep. 2004.
Gopalakrishnan, V., et al., "Adaptive Replication in Peer-to-Peer Systems", Department of Computer Science, University of Maryland, College Park, dated Feb. 2005.
Cox, P., "Proceedings of the 5th Symposium on Operating Systems Design and Implementation", Pastiche: Making Backup Cheap and Easy, USENIX Association, Boston, Massachusetts, USA, dated Dec. 9-11, 2002.
Chang-Yen. I., "Peer-to-Peer Architectures for Data Discovery, Distribution and Consistent Replication", ProQuest LLC, dated 2014.
Schwartz. J., "VMware Brings Adaptiva to AirWatch UEM for Windows 10 Deployments", Redmond Magazine, Blog Archive: The Schwarts Report, dated Jan. 11, 2017.
VMware, "Peer-to-Peer Distribution Management", VMware Workspace ONE UEM 1907, dated 2019.
VMware, "Peer-to-Peer Distribution", VMware Workspace ONE UEM 2001, dated 2020.

GLOBAL ENTITY DISTRIBUTION

RELATED APPLICATIONS

The present application is a continuation of U.S. application Ser. No. 16/526,397, filed on Jul. 30, 2019, which claims the benefit of priority to U.S. Provisional Patent Application Ser. No. 62/824,868 titled "GLOBAL ENTITY DISTRIBUTION", filed on Mar. 27, 2019, which is hereby incorporated by reference in its entirety.

FIELD

This disclosure relates to high availability of shared data items, and more particularly to techniques for global entity distribution.

BACKGROUND

Since the advent of networking and the Internet, computing systems have become more and more virtually and/or physically distributed. The "mainframe" of long ago has been replaced by multiple computing systems that are interconnected via the Internet. Any of these multiple computing systems can operate independently or in cooperation with one or more other computing systems. As an example, an enterprise might deploy multiple computing systems (e.g., multiple clusters) at geographically disparate sites (e.g., one site in New York, one site in Chicago, one site in San Francisco) to serve the computing demand of respective geographic zones (e.g., "East Coast", "Central", "West Coast", etc.).

Even though these multiple computing systems can operate independently, the computing systems may also need to cooperate to facilitate shared access to a certain class of data items. Such shared data items might include global entities that are maintained over multiple computing systems to facilitate consistent performance of certain operations at the systems. An example of such a shared data item is a data file identified as "policy.json" that specifies a policy for performing disaster recovery (DR) operations, backup operations, and/or other data protection operations. Such a policy might be shared to ensure that a single policy is consistently observed over all sites associated with the enterprise. Another example of a data item shared over the computing systems of an enterprise would be an "approved" logo for the enterprise stored in a file named "logo.jpg". The logo file might be shared to facilitate uniform and consistent marketing materials produced at each site of the enterprise.

One way to be certain that all sites covering all zones can share the exact same data item is to store the shared data item in one designated "centralized" repository that all zones can access (e.g., via the Internet). For example, the "policy.json" file can be stored in a storage facility located in a selected zone of the enterprise, such as the "Central" zone. However, there are problems with such a centralized data storage regime. Specifically, the computing system of the "Central" zone might suffer a failure and/or might experience a network outage that prevents the computing systems of the "East Coast" and "West Coast" zones from being able to access the centralized shared data item. Reliance on the availability of one single instance of the shared data item creates an unacceptably high risk that mission critical operations might not be able to be performed.

Another approach is to store an exact copy of the data item at each computing system associated with the sites or zones. When the copies of the data item at the computing systems match, the data item is said to be "synchronized" over the computing systems. Such an approach works when the data item is unchanging. However, in a multiple copy regime, when a particular data item is modified at any of the computing systems, the copies of the data item over the computing systems are no longer synchronized. Another approach is to designate one computing system as a "master" and the other computing systems as "slaves", where the master manages all changes to the data item. This approach, however, suffers from the same problem as a centralized data storage approach, specifically in that synchronization can fail if the master goes down or otherwise becomes unavailable to the slaves.

Yet another approach is to form a quorum from multiple computing systems and consult the quorum to manage updates to the data item performed at the computing systems. However, when managing data items shared across geographically distant computing systems, or in other situations that introduce long latencies between the computing systems, the foregoing quorum techniques cannot be used. What is needed is a mechanism for maintaining shared data items over multiple geographically disparate computing systems even in the presence of failures at any of the computing systems.

SUMMARY

The present disclosure describes techniques used in systems, methods, and in computer program products for shared global entity distribution, which techniques advance the relevant technologies to address technological issues with legacy approaches. More specifically, the present disclosure describes techniques used in systems, methods, and in computer program products for peer-to-peer synchronization of global entities over multiple clusters. Certain embodiments are directed to technological solutions for invoking a synchronization protocol at any source peer to distribute locally-incurred global entity modifications to one or more remote peers.

The disclosed embodiments modify and improve over legacy approaches. In particular, the herein-disclosed techniques provide technical solutions that address the technical problems attendant to maintaining shared data items over multiple geographically disparate computing systems in the presence of failures at the computing systems. Such technical solutions involve specific implementations (i.e., data organization, data communication paths, module-to-module interrelationships, etc.) that relate to the software arts for improving computer functionality.

The ordered combination of steps of the embodiments serve in the context of practical applications that perform steps for invoking a synchronization protocol at any source peer to distribute global entity modifications to one or more remote peers. The operations underlying the synchronization protocol overcome technological problems associated with maintaining shared data items over multiple geographically disparate computing systems in the presence of computing system failures. Specifically, rather than implement conventional data item replication techniques, which can be wasteful when dealing with geographically disparate network-interconnected computing systems, the techniques disclosed herein implement a peer-to-peer synchronization protocol that performs parsimoniously synchronized replication of data items between the geographically disparate computing systems.

Techniques for carrying out a synchronization protocol to distribute local global entity modifications to one or more remote peers involve technological solutions pertaining to technological problems that arise in the hardware and software arts pertinent to high-availability computing platforms. Aspects of the present disclosure achieve performance and other improvements in peripheral technical fields including (but not limited to) distributed data storage and computing cluster management.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
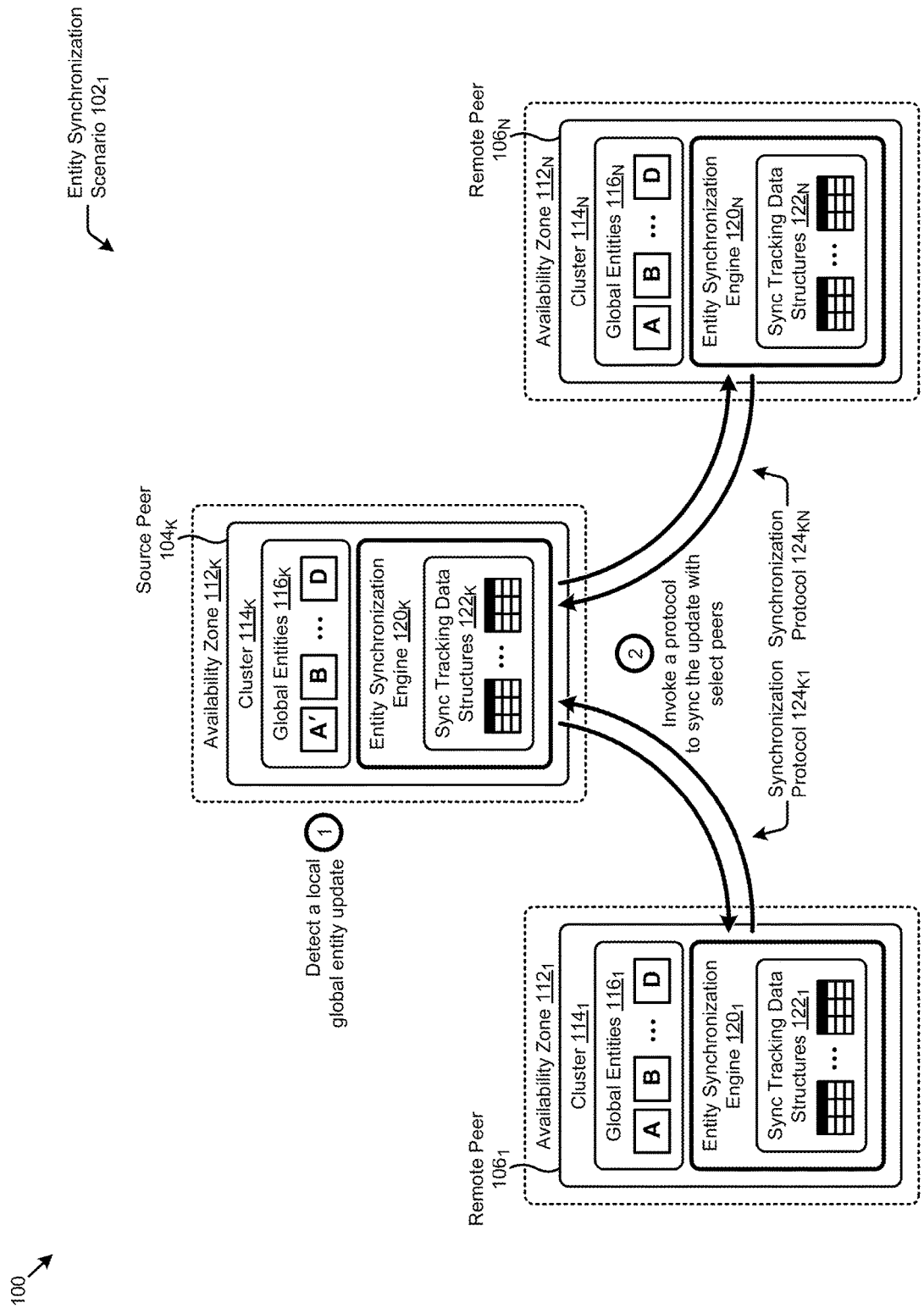
FIG. 1A and FIG. 1B present a computing environment in which embodiments of the present disclosure can be implemented.

Aspects of the present disclosure solve problems associated with using computer systems for maintaining shared data items over multiple geographically disparate computing systems in the presence of failures of computing system and/or networking system components. These problems are unique to, and may have been created by, various computer-implemented methods for maintaining shared data items over multiple geographically disparate computing systems. Some embodiments are directed to approaches for invoking a synchronization protocol at any source peer to distribute global entity modifications to one or more remote peers. The accompanying figures and discussions herein present example environments, systems, methods, and computer program products for peer-to-peer synchronization of global entities over multiple clusters.

Overview

Disclosed herein are techniques for invoking a synchronization protocol at any source peer from a set of clusters to distribute local global entity changes to one or more remote peers from the clusters. In certain embodiments, the set of clusters are geographically disparate clusters that interact as peers over inter-cluster communications. An instance of an entity synchronization engine is implemented at each cluster to manage one or more global entities that are shared over the clusters. Each instance of the entity synchronization engine listens for entity modifications (e.g., entity creations, updates, deletions, etc.) to the global entities that are performed locally. When a local global entity modification is detected at a cluster, or a source peer, the local instance of the entity synchronization engine invokes a synchronization protocol with some or all of the other clusters, or remote peers, to propagate the entity modification over the clusters. One or more synchronization messages (e.g., synchronization requests) are generated and issued from the entity synchronization engine of the source peer in accordance with the synchronization protocol for processing at the remote peers.

The respective instances of the entity synchronization engine at the remote peers process the synchronization messages (e.g., to locally implement the entity modification). In some cases, one or more synchronization messages (e.g., synchronization responses) are returned to the entity synchronization engine of the source peer. In certain embodiments, each entity synchronization engine accesses local instances of one or more specialized data structures for managing certain attributes associated with the local and/or remote instances of the global entities. In certain embodiments, entity modifications are validated before implementation. In certain embodiments, errors associated with synchronizing the entity modification are identified and corresponding alerts are issued. In certain embodiments, global entity information is synchronized in response to the addition or removal of one or more peers. In certain embodiments, the synchronization protocol can accommodate one or more failures (e.g., inter-cluster or intra-cluster communication failures).

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

Figure 1B:
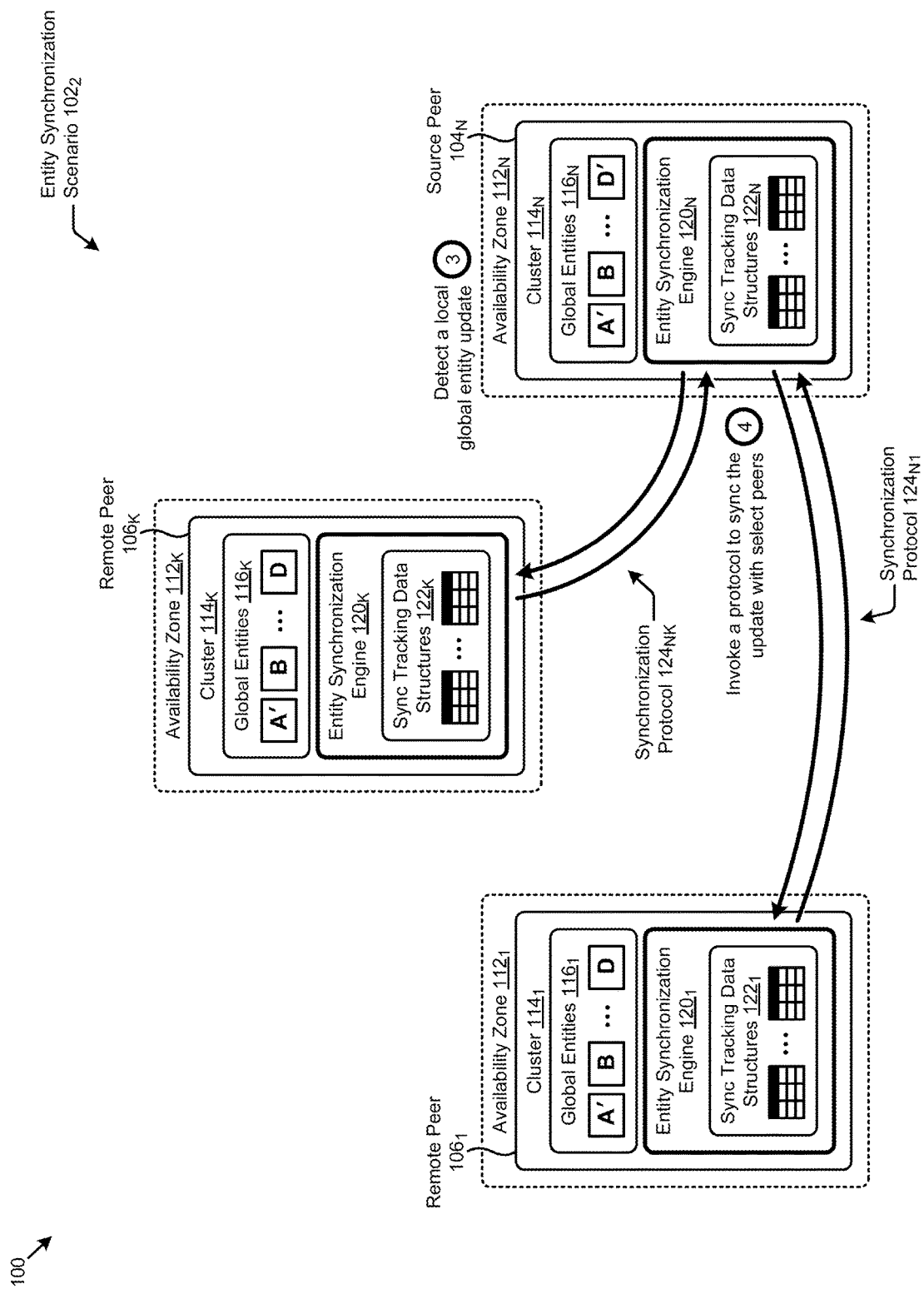

FIG. 1A and FIG. 1B present a computing environment 100 in which embodiments of the present disclosure can be implemented. As an option, one or more variations of computing environment 100 or any aspect thereof may be implemented in the context of the architecture and functionality of the embodiments described herein.

FIG. 1A and FIG. 1B illustrate aspects pertaining to invoking a synchronization protocol at any source peer to distribute global entity modifications to one or more remote peers. Specifically, the figures are being presented to illustrate synchronization of various global entities shared over multiple clusters and/or availability zones as facilitated by the herein disclosed techniques. More specifically, FIG. 1A illustrates an entity synchronization scenario $102_1$ where a modification to a global entity at a particular cluster in a corresponding availability zone is synchronized to two other clusters and respective availability zones in the computing environment. FIG. 1B illustrates an entity synchronization scenario $102_2$ where an entity modification at another cluster is synchronized over the other clusters and availability zones of the computing environment.

As used herein, a global entity is an information item of a logical group of information items that is/are shared over some set of computing resources. More specifically, a global entity might comprise various data items (e.g., database table rows, programming object instances, etc.) that are instantiated over various computing systems at geographically disparate sites associated with an enterprise. A global entity might be classified as a particular entity type based at least in part on the structure and/or content of the data items that comprise the global entity. For example, a global entity having a "user" entity type might comprise data items that describe certain information pertaining to the users of an enterprise. As another example, a global entity of a "policy" entity type might comprise data items that describe various aspects of a particular policy for disaster recovery, which disaster recovery policies are to be shared and enforced over the computing systems of an enterprise.

An entity modification is any change that occurs to a particular global entity (e.g., a change to a data protection policy or a change to a disaster recovery policy, etc.). In some cases, an entity modification might be associated with an entire global entity (e.g., an entity create operation, an entity delete operation, etc.). In other cases, an entity modification might be associated with one or more data items associated with the global entity (e.g., an entity update operation).

As depicted in entity synchronization scenario $102_1$ of FIG. 1A, three representative clusters (e.g., cluster $114_1$, cluster $114_K$, and cluster $114_N$) in computing environment 100 have access to local instances of various shared global entities (e.g., global entities $116_1$, global entities $116_K$, and global entities $116_N$). Such clusters might be geographically disparate clusters that interact as peers over inter-cluster communications. As can be observed, each of the clusters are within a corresponding availability zone (e.g., availability zone $112_1$, availability zone $112_K$, and availability zone $112_N$). As used herein, an availability zone is a logical collection of hardware components (e.g., nodes, switches, racks, etc.) that are affected by failures within the collection. An availability zone can also be referred to as a failure domain or availability domain.

As an example, an availability zone might comprise a single physical node appliance or a rack of node appliances. In computing environment 100, the availability zones comprise an entire cluster. In this case, for example, a failure in cluster $114_1$ will not affect either of cluster $114_K$ or cluster $114_N$. By storing the global entities over multiple availability zones, the availability of the global entities can be protected in the event of a failure at one of the clusters. As earlier discussed, however, when global entities are shared across geographically distant computing systems (e.g., clusters), or in other situations that introduce long latencies between the computing systems, certain approaches to synchronizing modifications to the global entities over the computing systems are deficient.

The herein disclosed techniques address the problems attendant to maintaining instances of global entities shared over multiple geographically disparate computing systems at least in part by implementing an entity synchronization engine at each of the computing systems. Specifically, as shown in FIG. 1A, entity synchronization engine $120_1$, entity synchronization engine $120_K$, and entity synchronization engine $120_N$ are implemented at cluster $114_1$, cluster $114_K$, and cluster $114_N$, respectively. The entity synchronization engines access local instances of specialized data structures (e.g., sync tracking data structures $122_1$, sync tracking data structures $122_K$, and sync tracking data structures $122_N$) to facilitate management (e.g., synchronization) of the global entities. More specifically, the foregoing sync tracking data structures improve the way a computer stores and retrieves data in memory when performing steps pertaining to peer-to-peer synchronization of global entities over multiple clusters, according to the herein-disclosed embodiments.

The sync tracking data structures and/or any other data structures described herein can organize and/or store the content of the structures using various techniques. For example, the content of the sync tracking data structures might be organized and/or stored in a tabular structure (e.g., relational database table) that has rows that relate various attributes with a particular global entity or data item of a global entity. As another example, the information might be organized and/or stored in a programming code object that has instances corresponding to a particular global entity or data item of a global entity, and properties corresponding to the various attributes associated with the global entity or data item of a global entity.

The entity synchronization engines at each cluster listen for entity modifications (e.g., entity create operations, entity update operations, entity delete operations, etc.) to the global entities that are performed locally. As illustrated in entity synchronization scenario $102_1$, a local modification to a global entity might be detected at cluster $114_K$ (operation 1). Specifically, entity "A" in global entities $116_K$ is marked as having been modified. In this case, cluster $114_K$ can be referred to as a source peer $104_K$ as a result of the entity modification being detected at cluster $114_K$. In response to detecting the entity modification, entity synchronization engine $120_K$ at source peer $104_K$ (e.g., cluster $114_K$) invokes a synchronization protocol with some or all of the other peer clusters to propagate the entity modification over the clusters (operation 2). As shown, a synchronization protocol $124_{K1}$ is initiated with entity synchronization engine $120_1$ of cluster $114_1$ and a synchronization protocol $124_{KN}$ is initiated with entity synchronization engine $120_N$ of cluster $114_N$. As such, cluster $114_1$ and cluster $114_N$ are referred to as a remote peer $106_1$ and a remote peer $106_N$, respectively, as they are remote participants in the synchronization protocol initiated by source peer $104_K$.

One or more synchronization messages (e.g., synchronization requests) are generated and issued from entity synchronization engine $120_K$ of source peer $104_K$ in accordance with the synchronization protocol for processing at the remote peers. The respective instances of the entity synchronization engine at the remote peers process the synchronization messages (e.g., to locally implement the entity modification). In some cases, one or more synchronization messages (e.g., synchronization responses) are returned from the remote peers to entity synchronization engine $120_K$ of source peer $104_K$. During the execution of the synchronization protocols between source peer $104_K$ and the remote peers (e.g., remote peer $106_1$ and remote peer $106_N$), the content of the sync tracking data structures are accessed to manage certain attributes associated with the local and/or remote instances of the global entities. For example, such sync tracking data can be accessed at each peer to facilitate validation synchronization requests, identification of entity modification conflicts, and/or other operations.

In entity synchronization scenario $102_2$ of FIG. 1B, a local modification to a global entity is detected at cluster $114_N$ (operation 3). Specifically, entity "D" in global entities $116_N$ is marked as having been modified. In this case, cluster $114_N$ is a source peer $104_N$ that invokes instantiations of a synchronization protocol (e.g., synchronization protocol $124_{NK}$ and synchronization protocol $124_{N1}$) with cluster $114_K$ (e.g., remote peer $106_K$) and cluster $114_1$ (e.g., remote peer $106_1$) to propagate the entity modification over the clusters (operation 4).

The foregoing inter-cluster global entity synchronization capability facilitated by the herein disclosed techniques serves to maintain synchronized instances of shared data items (e.g., global entities) over multiple geographically disparate computing systems (e.g., clusters and/or availability zones). Furthermore, the herein disclosed techniques facilitate synchronization of the shared data items in the presence of failures at the computing systems. For example, and as discussed in further detail herein, the aforementioned synchronization protocol and sync tracking data structures managed by the entity synchronization engines can facilitate automatic synchronization (e.g., restoration) of the global entities even when certain failures (e.g., a communication failure) have occurred at the computing systems. This failure-tolerant global entity synchronization capability facilitated by the herein disclosed techniques results in improvements in computer functionality that serve to reduce the demand for computer processing power, reduce the demand for computer memory and data storage, reduce network bandwidth usage, and reduce the demand for inter-component communication in computing environments.

Specifically, rather than implement conventional data item replication techniques which can be deficient over geographically disparate computing systems, the synchronization protocol and sync tracking data structures are implemented to replicate (e.g., synchronize) the data items over the computing systems. More specifically, the computing, storage, networking, and other resources consumed to resolve the entity modification conflicts and/or perform the entity restoration operations that can result from implementing conventional data item replication techniques over geographically disparate computing systems are eliminated.

One embodiment of a technique for distributing global entities over geographically disparate computing systems is disclosed in further detail as follows.

Figure 2:
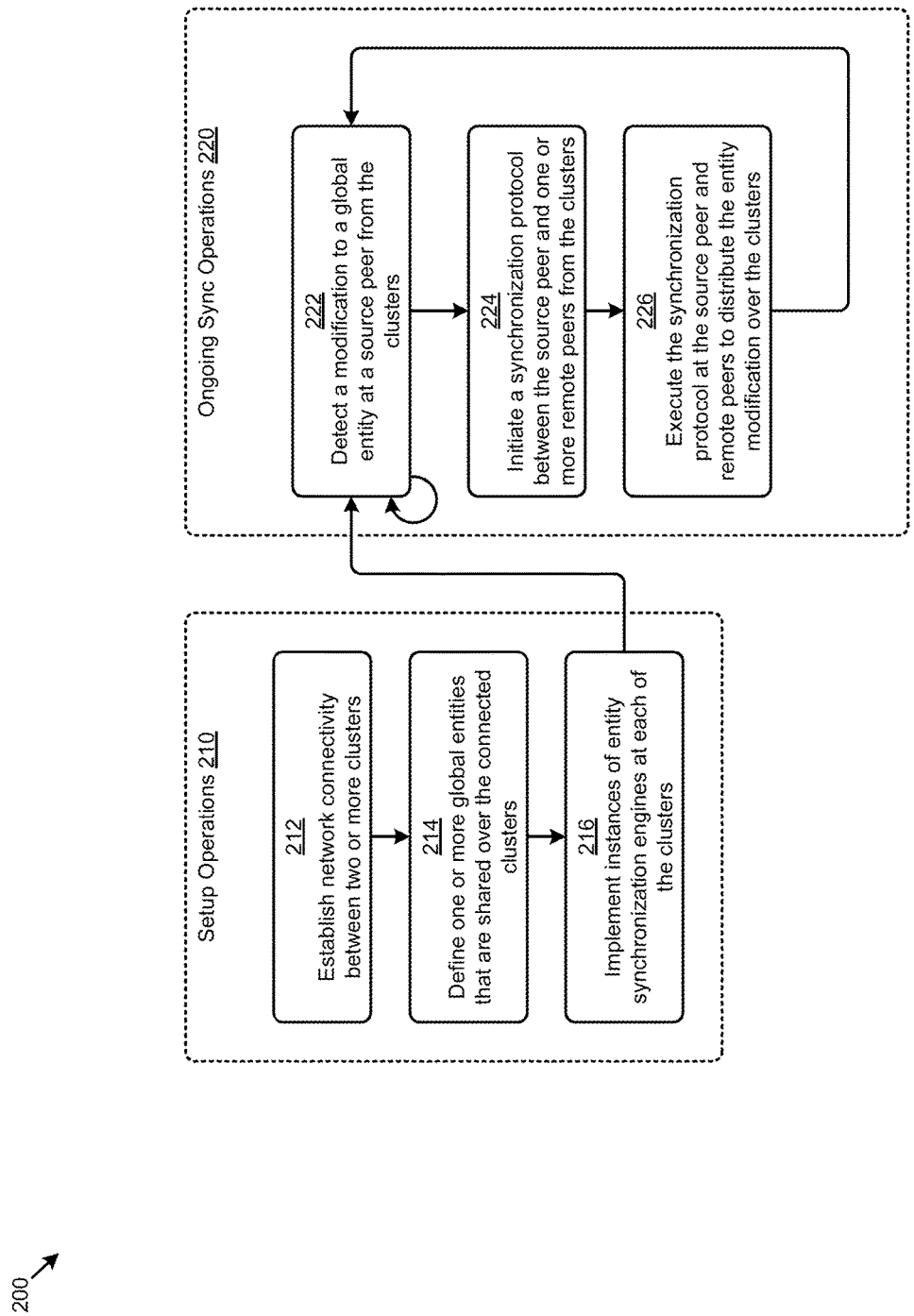
FIG. 2 depicts an example global entity distribution technique as implemented in systems that facilitate peer-to-peer synchronization of global entities, according to an embodiment.

FIG. 2 depicts an example global entity distribution technique 200 as implemented in systems that facilitate peer-to-peer synchronization of global entities. As an option, one or more variations of global entity distribution technique 200 or any aspect thereof may be implemented in the context of the architecture and functionality of the embodiments described herein. The global entity distribution technique 200 or any aspect thereof may be implemented in any environment.

FIG. 2 illustrates aspects pertaining to invoking a synchronization protocol at any source peer to distribute global entity modifications to one or more remote peers. Specifically, the figure is presented to illustrate one embodiment of certain steps and/or operations that maintain (e.g., synchronize) various global entities that are shared over multiple geographically disparate computing systems. As illustrated, a first portion of the steps and/or operations comprise a set of setup operations 210 and a second portion of the steps and/or operation comprise a set of ongoing sync operations 220.

Setup operations 210 of global entity distribution technique 200 can commence by establishing network connectivity between two or more clusters in a computing environment (step 212). Such clusters might be geographically disparate clusters (e.g., at respective sites of an enterprise) that interact as peers using inter-cluster communications over the network. One or more global entities that are to be shared over the clusters are defined (step 214). For example, an enterprise might define a "user" global entity having content that describes (e.g., name, identifier, address, etc.) the users of the enterprise, and one or more "policy" global entities having content that describes various policies (e.g., data protection policy, data security policy, disaster recovery policy, etc.) that are enterprise-wide. To facilitate maintenance of the global entities over the cluster according to the herein disclosed techniques, an instance of an entity synchronization engine is implemented at each of the clusters (step 216). For example, each instance of the entity synchronization engine might be implemented at a centralized access point of a respective cluster.

Ongoing sync operations 220 of global entity distribution technique 200 can commence by detecting a modification to a global entity at a source peer from the clusters (step 222).

Specifically, the entity synchronization engines at each cluster will continuously listen for entity modifications to any of the local instances of the global entities.

As earlier described, an entity modification can be associated with creating an entity, updating an entity, or deleting an entity. When an entity modification is detected at a particular cluster, that cluster is referred to as the source peer as pertains to the detected entity modification. In response to detecting an entity modification, the source peer initiates a synchronization protocol with each of a selected set of remote peers from the clusters (step 224). The set of remote peers can include some or all of the clusters other than the cluster that corresponds to the source peer.

Each instantiation of the synchronization protocol initiated by the source peer is then executed by the source peer and the respective remote peer to distribute the entity modification over the clusters (step 226). As further discussed in more detail herein, execution of the synchronization protocol can involve generating and issuing synchronization messages (e.g., synchronization requests, synchronization responses, etc.), and processing of such synchronization messages by the various instances of the entity synchronization engine.

One embodiment of a system, data flows, and data structures for implementing the global entity distribution technique 200 and/or other herein disclosed techniques is disclosed as follows.

Figure 3:
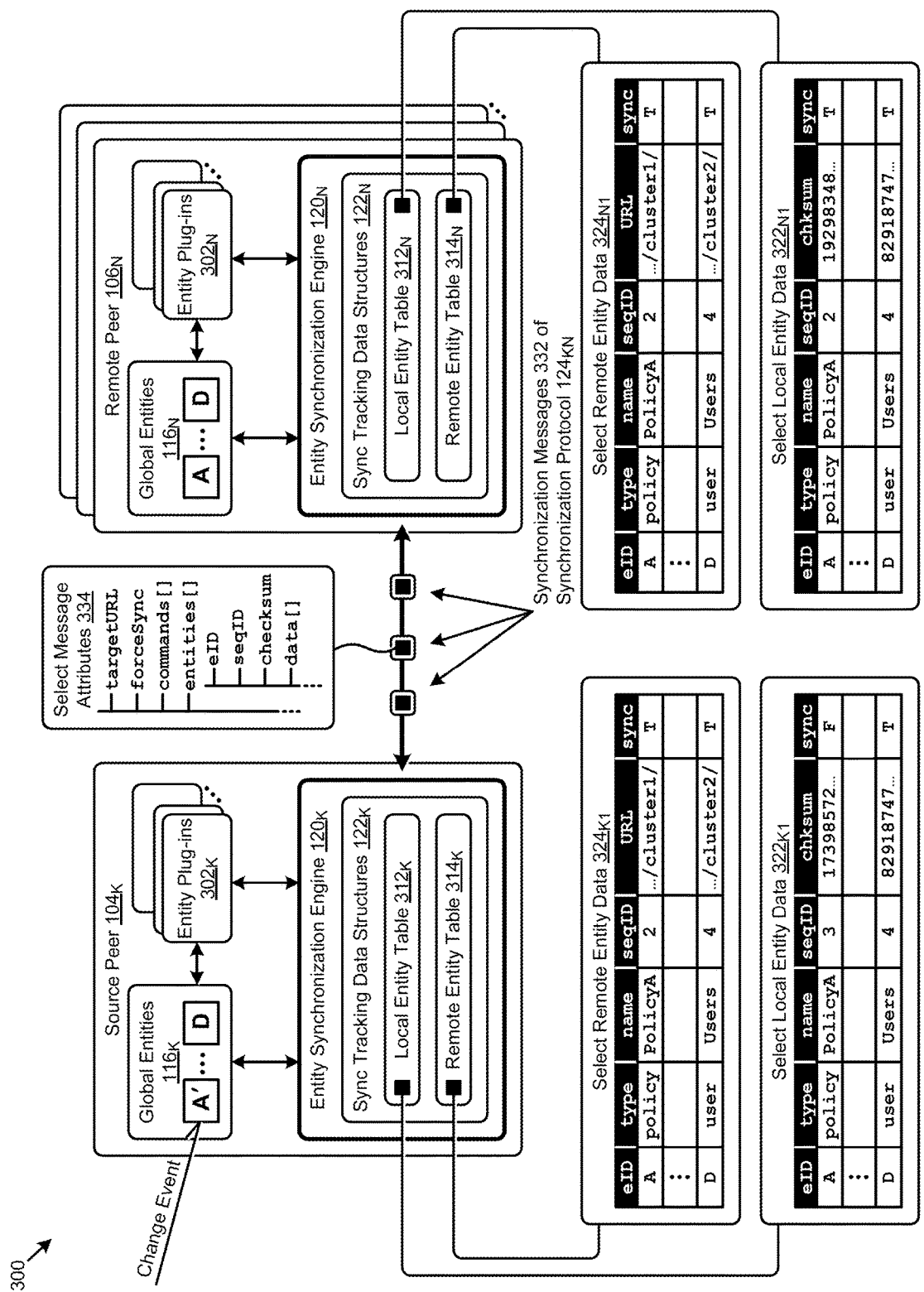
FIG. 3 illustrates a selected set of specialized data structures that improves the way a computer stores and retrieves data in systems that perform peer-to-peer synchronization of global entities, according to an embodiment.

FIG. 3 illustrates a selected set of specialized data structures 300 that improves the way a computer stores and retrieves data in systems that perform peer-to-peer synchronization of global entities. As an option, one or more variations of specialized data structures 300 or any aspect thereof may be implemented in the context of the architecture and functionality of the embodiments described herein. The specialized data structures 300 or any aspect thereof may be implemented in any environment.

FIG. 3 illustrates aspects pertaining to invoking a synchronization protocol at any source peer to distribute global entity modifications to one or more remote peers. Specifically, the figure is being presented to illustrate one embodiment of various data structures that organize certain data used to facilitate the herein disclosed techniques. More specifically, the representative data structures highlighted in specialized data structures 300 pertain to the sync tracking data structures and the synchronization messages as earlier described. The figure furthers illustrates certain representative components and data flows associated with the data structures. The data structures, components, and data flows shown in FIG. 3 present one partitioning and associated data manipulation approach. The specific example shown is purely exemplary, and other subsystem organization choices, other data structure organization choices, and/or other partitionings are reasonable.

In the embodiment of FIG. 3, the entity synchronization engines (e.g., entity synchronization engine $120_K$ and entity synchronization engine $120_N$) of source peer $104_K$ and remote peer $106_N$ access local instances of sync tracking data structures (e.g., sync tracking data structures $122_K$ and sync tracking data structures $122_N$) that each comprise a local entity table (e.g., local entity table $312_K$ and local entity table $312_N$) and a remote entity table (e.g., remote entity table $314_K$ and remote entity table $314_N$). The local entity table comprises content (e.g., data) that pertains to local instances of a set of global entities (e.g., global entities $116_K$ for source peer $104_K$, and global entities $116_N$ for remote peer $106_N$). The remote entity table comprises content (e.g., data) that pertains to remote instances of the global entities (e.g., global entities $116_K$ for source peer $104_K$, and global entities $116_N$ for remote peer $106_N$).

The embodiment of FIG. 3 also depicts a set of entity plug-ins (e.g., entity plug-ins $302_K$ and entity plug-ins $302_N$) at source peer $104_K$ and remote peer $106_N$. The entity plug-ins are sets of programming code that facilitate various operations over one or more of the global entities. In some cases, a particular entity plug-in might be associated with a particular type of global entity. For example, a "user" entity plug-in might process operations over a "user" global entity, whereas a "policy" entity plug-in might process operations over a "policy" global entity. More specifically, an entity synchronization engine at a remote peer might issue a call to an entity plug-in to implement all or portions of a synchronization protocol to locally process an entity modification raised by a remote source peer. In certain embodiments, one or more of the entity plug-ins can be implemented as code that is local to the particular peer or cluster or the one or more entity plug-ins can be implemented as code that is hosted externally to a particular peer or cluster (e.g., as a web service at different cluster).

FIG. 3 depicts certain select data associated with source peer $104_K$ and remote peer $106_N$ at a moment in time just after an entity modification to entity "A" was detected at source peer $104_K$ (e.g., after operation 1 of FIG. 1A). As shown, the occurrence of the change event to cause modification of entity "A" to modified entity "A" happens at the source peer. The change event causes invocation of a synchronization protocol that sends synchronization messages from the source peer to any remote peers. In accordance with the herein-disclosed techniques, the occurrence of the change event causes the sequence ID of the local entity table to be incremented (e.g., for example, from "2" to "3") after the change has occurred on the remote peers.

At this moment in time, the other entity tables still have the previously synchronized sequence ID value "2". This is shown in the data structure representations included at the bottom portion of FIG. 3. Specifically, the data structure representations depict a set of select local entity data $322_{K1}$ and a set of select remote entity data $324_{K1}$. Also depicted are a set of select local entity data $322_{N1}$ and a set of select remote entity data $324_{N1}$ (e.g., from sync tracking data structures $122_N$ of remote peer $106_N$).

Each instance of select local entity data comprises a data record (e.g., table row or object instance) for a particular local instance of a global entity that might contain an entity identifier (e.g., stored in a "eID" field), an entity type (e.g., stored in a "type" field), a human-readable entity name (e.g., stored in a "name" field), a sequence identifier (e.g., stored in a "seqID" field), a checksum of the global entity (e.g., stored in a "chksum" field), a local synchronization status indicator (e.g., stored in a "sync" field), and/or other local global entity attributes. Furthermore, and as depicted in each instance of select remote entity data, a data record (e.g., table row or object instance) for a particular remote instance of a global entity might contain an entity identifier (e.g., stored in a "eID" field), an entity type (e.g., stored in a "type" field), a human-readable entity name (e.g., stored in a "name" field), a sequence identifier (e.g., stored in a "seqID" field), a universal resource locator (URL) of a peer (e.g., cluster access point) that initiated a modification to the global entity (e.g., stored in a "URL" field), a remote synchronization status indicator (e.g., stored in a "sync" field), and/or other remote global entity attributes.

Various combinations of the aforementioned global entity checksum, sequence identifier, synchronization status indicators, and/or other information are managed to facilitate synchronization of the global entities over the peers. Differences in certain values pertaining to a particular modified global entity are detected during operation of the protocol between a source peer and one or more remote peers. For example, in response to detecting a modification to entity "A" at source peer $104_K$, the "seqID" and "chksum" fields associated with entity "A" in select local entity data $322_{K1}$ at source peer $104_K$ are populated with values that are different from the "seqID" and "chksum" fields associated with entity "A" in select local entity data $322_{N1}$ at remote peer $106_N$. Such data differences can be detected at the peers. Moreover, the specific characteristics of such data differences can be consulted to facilitate certain entity modification validation operations, entity modification conflict identification operations, and/or other operations, as described in more detail herein. As such, the techniques (e.g., logic, algorithms, etc.) implemented at the peers (e.g., clusters) for determining the foregoing information (e.g., checksums, sequence identifiers, synchronization status indicators, etc.) are consistent over the peers. For example, the checksum algorithm (e.g., parity byte, parity word, modular sum, etc.) that is used when implementing the herein disclosed techniques is consistent (e.g., using the checksum algorithm) across all peers that share a particular set of global entities.

Such data comparisons are performed in accordance with a synchronization protocol $124_{KN}$ executed by source peer $104_K$ and remote peer $106_N$. As indicated in FIG. 3, and as earlier described, synchronization protocol $124_{KN}$ can include the communication of various instances of synchronization messages.

The shown synchronization messages 332 are exchanged between peer clusters. The synchronization messages comprise sufficient information for a source and a remote peer to agree on a version of a global entity, even in the face of long latencies between computing clusters. Specifically, the synchronization messages comprise a set of select message attributes 334. As one example embodiment, a particular synchronization message might comprise a payload that describes a URL of a target peer to receive the message (e.g., stored in a "targetURL" field), a flag to indicate synchronization is to be performed without certain validations (e.g., stored in a "forceSync" field), a set of commands to be observed by the target peer (e.g., stored in a "commands [ ]" object), a set of global entities associated with the synchronization message (e.g., stored in an "entities [ ]" object), and/or other information associated with the synchronization message. As further shown in select message attributes 334, each instance of the "entities [ ]" object might describe an entity identifier of a particular global entity (e.g., stored in an "eID" field), a sequence identifier for the global entity (e.g., stored in a "seqID" field), a checksum of the global entity (e.g., stored in a "chksum" field), a data object comprising the content of the global entity (e.g., stored in a "data [ ]" field), and/or other attributes of the global entity.

The foregoing discussions include techniques for detecting entity modifications associated with a set of global entities shared over multiple clusters (e.g., step 222 of FIG. 2), which techniques are disclosed in further detail as follows.

Figure 4:
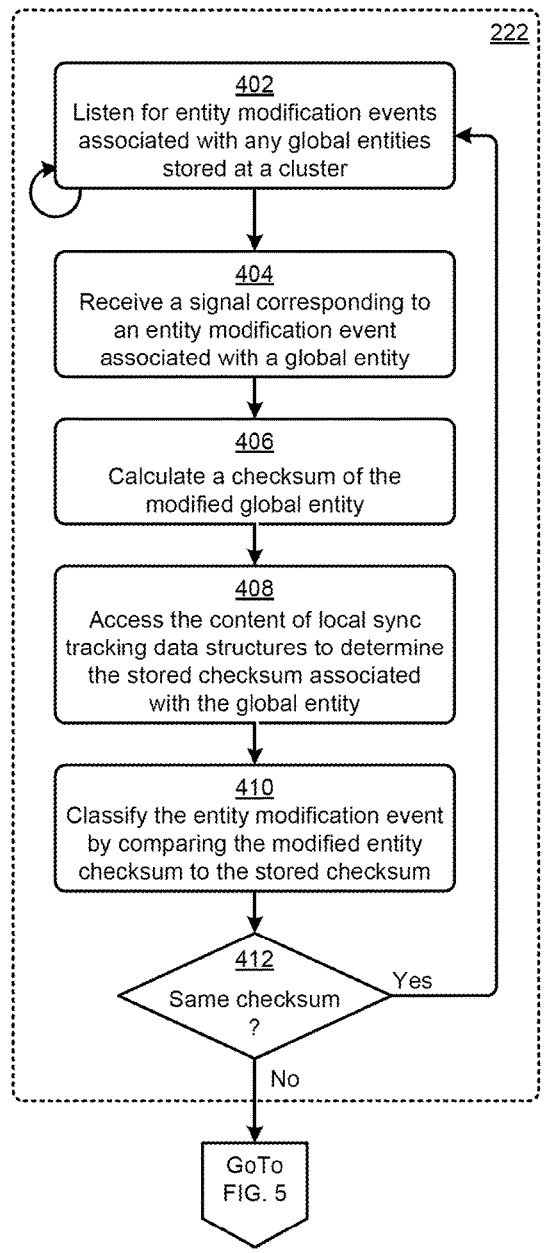
FIG. 4 presents an example global entity modification detection technique as implemented in systems that facilitate peer-to-peer synchronization of global entities, according to an embodiment.
Figure 4:
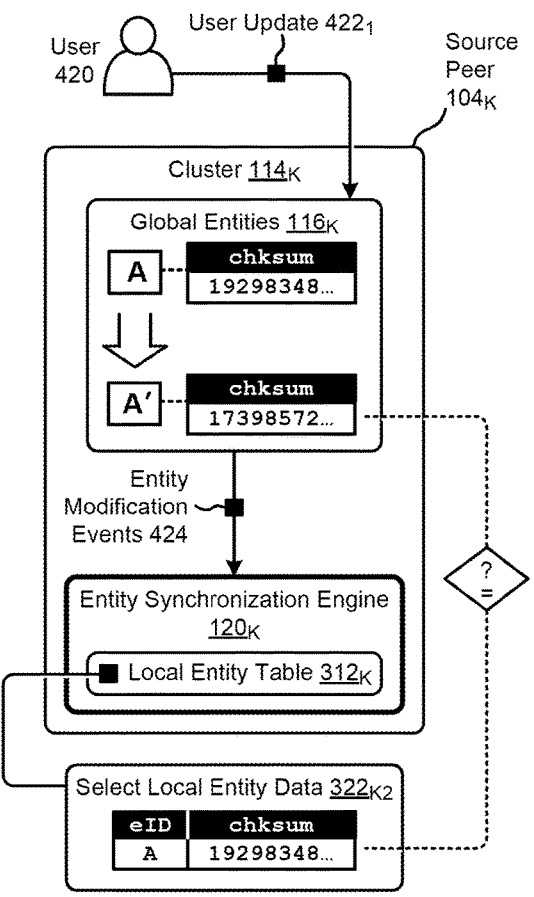

FIG. 4 presents an example global entity modification detection technique 400 as implemented in systems that facilitate peer-to-peer synchronization of global entities. As an option, one or more variations of global entity modification detection technique 400 or any aspect thereof may be implemented in the context of the architecture and functionality of the embodiments described herein. The global entity modification detection technique 400 or any aspect thereof may be implemented in any environment.

FIG. 4 illustrates aspects pertaining to invoking a synchronization protocol at any source peer to distribute global entity modifications to one or more remote peers. Specifically, the figure is presented to illustrate one embodiment of certain steps and/or operations for detecting entity modifications associated with a set of global entities shared over multiple clusters. As depicted in the figure, portions of the steps and/or operations are associated with step 222 of FIG. 2. A representative scenario is also shown in the figure to illustrate an example application of global entity modification detection technique 400.

Global entity modification detection technique 400 can commence by continuously listening for entity modification events associated with global entities stored at a cluster (step 402). As illustrated, entity synchronization engine $120_K$ at cluster $114_K$ might listen for various entity modification events 424 associated with global entities $116_K$. An entity modification event, as used herein, is an event that occurs at a computing system that is responsive to, or invokes, one or more entity modifications associated with one or more global entities. An entity modification event might correspond to an entity modification to one or more data items of a global entity that occurs at a database storing the global entity. In this case, the entity modifications might be performed by a user or by some system or agent. For example, a user 420 might apply a user update $422_1$ to a global entity (e.g., entity "A" in global entities $116_K$). As another example, entity synchronization engine $120_K$ might perform a system update to a global entity when carrying out an instance of a synchronization protocol as described herein. In other cases, an entity modification event might be raised to invoke a synchronization of one or more global entities after a system failure involving the global entities has been remediated.

At some moment in time, a signal corresponding to an entity modification event associated with a global entity might be received (step 404). For example, entity synchronization engine $120_K$ might receive a signal for a database management agent indicating that entity "A" has been modified. In response to receiving the entity modification event signal, the then-current checksum of the modified global entity is determined (step 406). As illustrated, the then-current checksum of entity "A" (e.g., including the subject modifications) is represented as "17398572 . . . ". The content of local instances of sync tracking data structures are accessed to determine the stored checksum associated with the global entity (step 408). As indicated in a set of select local entity data $322_{K2}$ from local entity table $312_K$, the stored checksum is represented by "19298348 . . . ", which corresponds to entity "A" before the subject modification was applied.

The then-current checksum is then compared to the stored checksum to classify the entity modification event (step 410). If the checksums are the same (see "Yes" path of decision 412), the entity modification event is classified as related to a system-performed modification (e.g., from a synchronization operation) and no further action is taken. If the checksums are not the same (see "No" path of decision 412), the entity modification event is classified as related to a user-performed modification and further actions are taken as discussed in FIG. 5. In the case where a user-performed entity modification is detected, the cluster (e.g., cluster $114_K$) at which the entity modification event is detected can be considered a source peer (e.g., source peer $104_K$) from a set of multiple clusters that interact as peers.

Figure 5:
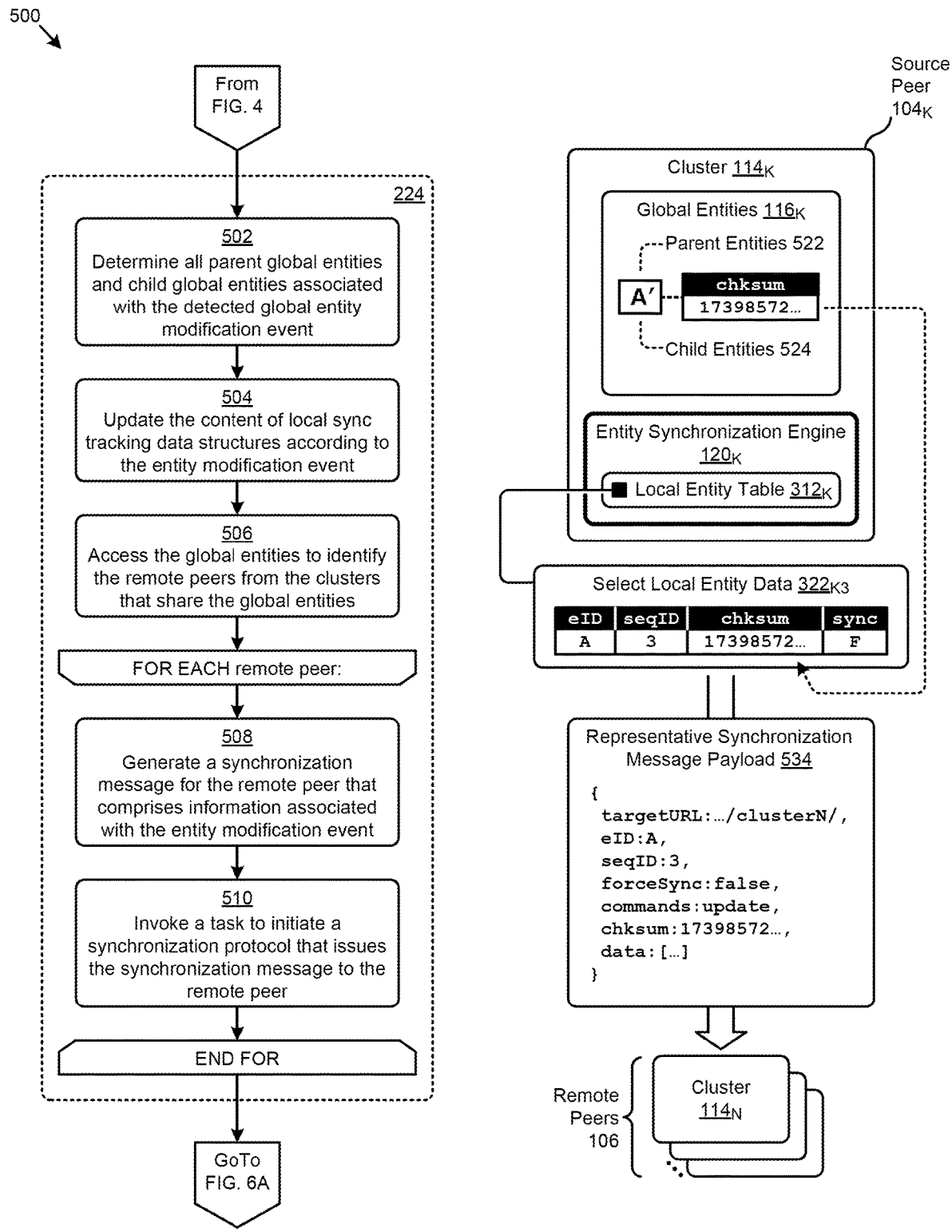
FIG. 5 depicts an example synchronization protocol initiation technique as implemented in systems that facilitate peer-to-peer synchronization of global entities, according to an embodiment.

According to the herein disclosed techniques, when certain entity modifications or entity modification events are detected, a synchronization protocol is initiated between a source peer and one or more remote peers (e.g., at step 224 of FIG. 2, and as further described in FIG. 5).

FIG. 5 depicts an example synchronization protocol initiation technique 500 as implemented in systems that facilitate peer-to-peer synchronization of global entities. As an option, one or more variations of synchronization protocol initiation technique 500 or any aspect thereof may be implemented in the context of the architecture and functionality of the embodiments described herein. The synchronization protocol initiation technique 500 or any aspect thereof may be implemented in any environment.

FIG. 5 illustrates aspects pertaining to invoking a synchronization protocol at any source peer to distribute global entity modifications to one or more remote peers. Specifically, the figure is presented to illustrate one embodiment of certain steps and/or operations for initiating a synchronization protocol between a source peer and one or more remote peers, where the source peer and the remote peers correspond to clusters from a set of multiple clusters that interact over a network. As depicted in the figure, portions of the steps and/or operations are associated with step 224 of FIG. 2. A representative scenario is also shown in the figure to illustrate an example application of synchronization protocol initiation technique 500.

Synchronization protocol initiation technique 500 can commence by determining all of the global entities associated with an entity modification event at a source peer from a set of two or more clusters (step 502). A particular entity modification event is often associated with one global entity. For example, entity "A" in global entities $116_K$ at cluster $114_K$ (e.g., source peer $104_K$) might be a "user" entity type that is updated as part of an onboarding process for a new user at an enterprise. In some cases, a modification to one global entity might impact other global entities (e.g., one or more parent entities 522 and/or one or more child entities 524). In the foregoing scenario, for example, adding the new user might also affect a "permissions" global entity. The entity relationships (e.g., dependencies) can be managed in applications of the herein disclosed techniques to synchronize all global entities associated with a particular entity modification or entity modification event.

When the global entities associated with the entity modification event are determined, the content of local instances of the sync tracking data structures are updated in accordance with the entity modification event (step 504). As an example, the shown set of select local entity data $322_{K3}$ from local entity table $312_K$ at source peer $104_K$ indicates the "chksum" might be updated to store the then-current checksum associated with the modified entity "A" in global entities $116_K$. The "sync" status indicator in local entity table $312_K$ is also changed to false or "F" to indicate entity "A" is changed locally but not synchronized with other peers. The "seqID" status indicator is incremented (e.g., from "2" to "3") in local entity table $312_K$ to reflect a modification. In this and other embodiments, the incrementing at the local entity is performed after the change has occurred on the remote peers.

The global entities associated with the entity modification event are accessed to identify one or more remote peers that share the global entities (step 506). For the example scenario illustrated in FIG. 5, a set of remote peers 106 that includes at least cluster $114_N$ might be identified as being associated with the entity modification event. In some cases, certain metadata stored with a particular global entity is accessed to identify the one or more remote peers (e.g., clusters) that share the global entity. When two or more global entities are associated with an entity modification event (e.g., a subject entity with parent entities and/or child entities), the remote peers associated with each of the global entities are identified. In some cases, the respective sets of remote peers associated with the global entities can be different.

For each remote peer associated with global entities of an entity modification event, a synchronization message comprising information pertaining to the event is generated for the remote peer (step 508). As an example, a representative synchronization message payload 534 for cluster $114_N$ describes a target URL for the remote peer (e.g., stored as a "targetURL" value) and, for each global entity (e.g., subject entity, parent entities, child entities, etc.) affected by the entity modification event at the remote peer, an entity identifier (e.g., stored as an "eID" value), a sequence identifier (e.g., stored as a "seqID" value), a forced synchronization directive (e.g., stored as a "forceSync" value), a list of commands to execute at the remote peer (e.g., stored as a "commands" value), a checksum of the global entity (e.g., stored as a "chksum" value), the content of the global entity (e.g., stored as a "data" object), and/or other information pertaining to the global entities and/or entity modification event. A "true" setting of the "forceSync" value might indicate that one or more validation operations, as described in more detail herein, are to be circumvented at the remote peer, whereas a "false" setting of the "forceSync" value might indicate that the validation operations are to be performed. The "commands" communicated to the remote peer in the synchronization message might include the shown "update" command, but may also include a "create" command, a "delete" command, an "initiate" command, and/or other commands, or any combination thereof.

A task is then invoked to initiate a synchronization protocol that issues the synchronization message to the remote peer (step 510). When two or more global entities are affected by an entity modification event for a particular remote peer, a single task might be issued with a synchronization message that identifies the actions (e.g., commands) to perform over the global entities at the remote peer. In other cases, a respective set of ordered tasks for each of the global entities might be queued to initiate instances of the synchronization protocol that synchronize the global entities in a specified order (e.g., dependent or child entities before parent entities).

Figure 6A:
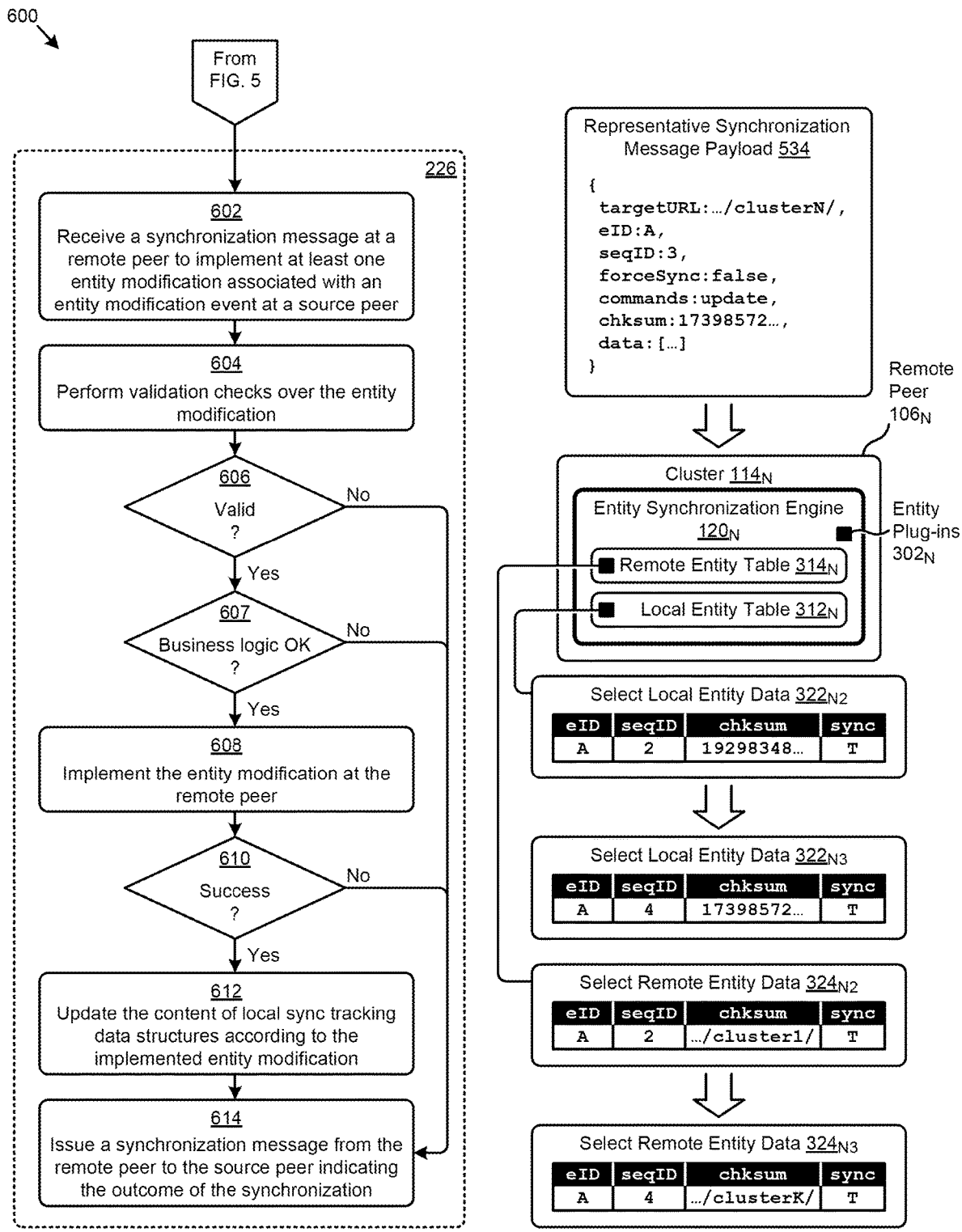
FIG. 6A and FIG. 6B depict an example synchronization message processing technique as implemented in systems that facilitate peer-to-peer synchronization of global entities, according to an embodiment.
Figure 6B:
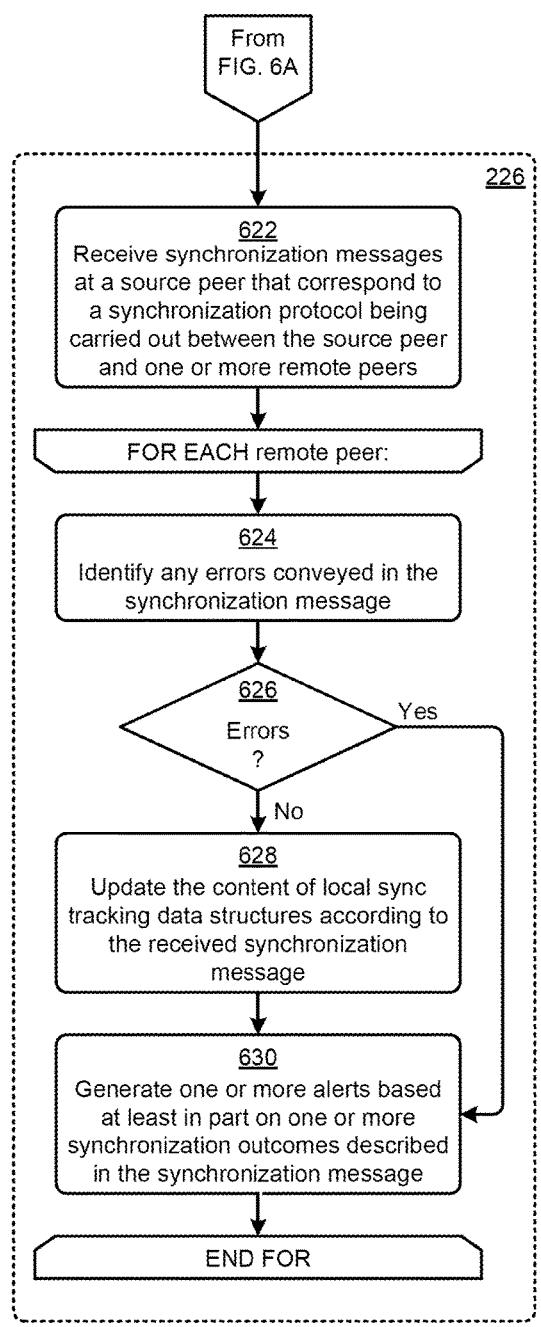
Figure 6B:
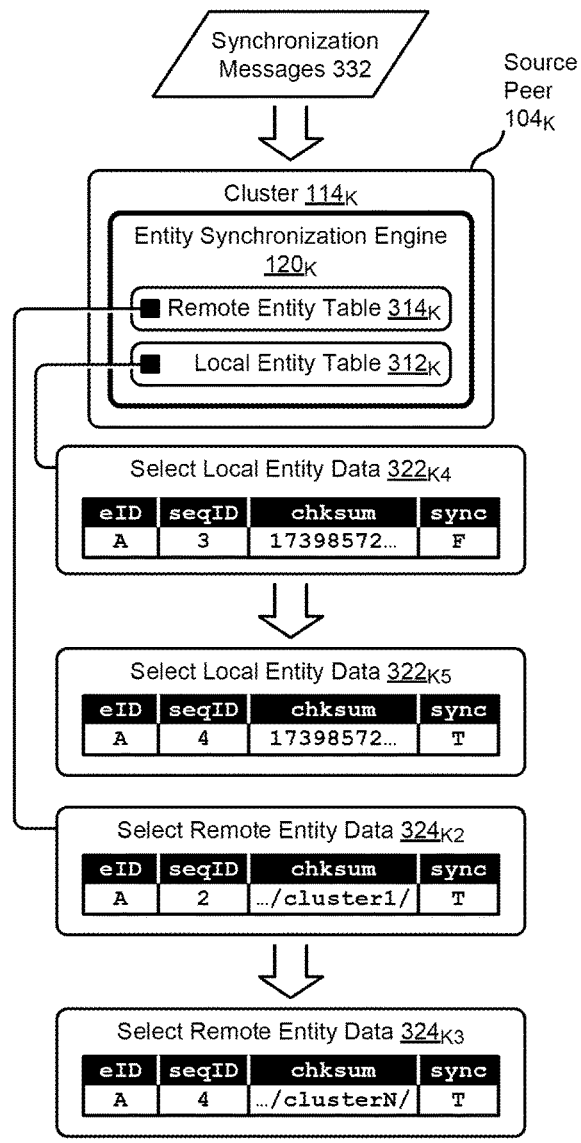

When a synchronization protocol is initiated with a remote peer, the synchronization messages transmitting in accordance with the protocol are executed at the remote peer and source peer (e.g., step 226 of FIG. 2, and as further described in FIG. 6A and FIG. 6B).

FIG. 6A and FIG. 6B depict an example synchronization message processing technique 600 as implemented in systems that facilitate peer-to-peer synchronization of global entities. As an option, one or more variations of synchronization message processing technique 600 or any aspect thereof may be implemented in the context of the architecture and functionality of the embodiments described herein. The synchronization message processing technique 600 or any aspect thereof may be implemented in any environment.

FIG. 6A and FIG. 6B illustrate aspects pertaining to invoking a synchronization protocol at any source peer to distribute global entity modifications to one or more remote peers. Specifically, the figures are presented to illustrate one embodiment of certain steps and/or operations for processing various synchronization messages issued in accordance with the synchronization protocol at a representative remote peer (e.g., FIG. 6A) and at a representative source peer (e.g., FIG. 6B). As depicted in the figures, portions of the steps and/or operations are associated with step 226 of FIG. 2. A representative scenario is also shown in the figures to illustrate an example application of synchronization message processing technique 600.

Referring to FIG. 6A, synchronization message processing technique 600 can commence by receiving a synchronization message at a remote peer to implement at least one entity modification associated with an entity modification event at a source peer (step 602). As illustrated, a synchronization message having the representative synchronization message payload 534 might be received at remote peer $106_N$. More specifically, the synchronization message might be received at entity synchronization engine $120_N$ of cluster $114_N$. The entity modification specified in the synchronization message is validated at the remote peer (step 604). For example, certain business logic rules (e.g., policy editing rules) might be applied to the entity modification requested in the synchronization message to determine if the modification can be implemented at the remote peer. Such business logic validations might be performed by passing the synchronization message information to one or more instances of entity plug-ins $302_N$ that correspond to the entity types specified in the message (e.g., the entity type of entity "A") and applying the business logic or rules (e.g., at the plug-ins) to determine a validation outcome.

Other entity modification validation operations might check to see if there are any local updates to a subject global entity that have not yet been synchronized over the associated peers or clusters that share the subject global entity (e.g., including the source peer that issued the received synchronization message). The content of the local instances of the sync tracking data structures can facilitate such validation operations. Specifically, a set of select local entity data $322_{N2}$ from local entity table $312_N$ at remote peer $106_N$ can be accessed to determine the "sync" status indicator value, the stored "chksum" value, and/or the "seqID" value associated with entity "A". If the "sync" value is "T", the stored "chksum" value is different from the "chksum" value in the synchronization message, and the "seqID" value is less than the "seqID" value in the synchronization message, then the requested entity modification is validated. If any of the foregoing conditions are not met, some type of conflict pertaining to performing the entity modification is present. As such, the entity modification is deemed invalid. In certain embodiments, validation operations that check for entity modification conflicts are not performed when "forceSync" is set to "true" in the synchronization message, whereas validation operations that check for compliance with corresponding business logic may still be performed. In this example embodiment, "forceSync" is set to "false", therefore validation operations that check for entity modification conflicts are performed (e.g., at step 604).

If the entity modification specified in the synchronization message is valid (see "Yes" path of decision 606), then business logic checks (if any) are performed, and if the business logic checks pass (decision 607), then the entity modification is implemented at the remote peer (step 608). Otherwise, if decision 606 or decision 607 takes its respective "No" path, then a message is emitted (e.g., at step 614).

Strictly as one example, entity synchronization engine $120_N$ may call one or more of the entity plug-ins $302_N$ to perform the modification. If the entity modification is successful (see "Yes" path of decision 610), the content of local instances of sync tracking data structures are updated according to the implemented entity modification (step 612).

For example, as can be observed in a comparison of select local entity data $322_{N2}$ and select local entity data $322_{N3}$ from local entity table $312_N$, the "seqID" and "chksum" field values associated with entity "A" might be updated. Specifically, when updating the "seqID" in local entity table $312_N$, the maximum of the "seqID" in representative synchronization message payload 534 (e.g., "3") and the "seqID" in local entity table $312_N$ (e.g., "2") is first determined. The "seqID" in local entity table $312_{N3}$ is then updated to equal the determined maximum value incremented by one (e.g., from "3" to "4"). Furthermore, and as can be observed by visual comparison of select remote entity data $324_{N2}$ and select remote entity data $324_{N3}$, the "seqID" and "URL" field values associated with entity "A" are shown as having been updated. Also, the "URL" field value is updated to reflect the URL of the source peer (e.g., " . . . /clusterK/") that issued the synchronization message.

In some embodiments, peers perform a retrieval to determine the outcome of the foregoing entity modification. For example, a source peer can determine the outcome of the operations (e.g., updates to the local entity table) by querying the remote peer. In other embodiments, and as shown, a synchronization message indicating the outcome of the entity modification (e.g., entity synchronization) is issued to the source peer from the remote peer (step 614). For example, if the entity modification is implemented and the corresponding updates are applied to the local instances of the sync tracking data structures, a synchronization message indicating a successful synchronization at the remote peer is issued. If one or more validations failed (see "No" path of decision 606) or the entity modification was not successfully implemented (see "No" path of decision 610), a synchronization message indicating the type of error (e.g., entity modification conflict, entity write timeout, connection timeout, etc.) is issued to the source peer.

Referring to FIG. 6B, one or more synchronization messages from respective remote peers are received at a source peer (step 622). For example, the entity synchronization engine $120_K$ of source peer $104_K$ (e.g., cluster $114_K$) might receive multiple instances of synchronization messages 332 from various remote peers in accordance with respective instances of synchronization protocols initiated by source peer $104_K$ with those remote peers. For each remote peer from which a synchronization message is received, any errors conveyed in the synchronization message are identified (step 624). If no errors are identified (see "No" path of decision 626), the content of local instances of sync tracking data structures are updated in accordance with the synchronization message received from the remote peer (step 628). For example, as can be observed in a comparison of select local entity data $322_{K4}$ and select local entity data $322_{K5}$ from local entity table $312_K$, the "seqID" and "sync" field values associated with entity "A" might be updated. Specifically, the "seqID" can be updated to the "seqID" received in the synchronization message from the remote peer (e.g., from "3" to "4") and the "sync" can be set from "F" to "T". Furthermore, and as can be observed by a visual comparison of select remote entity data $324_{K2}$ and select remote entity data $324_{K3}$ from remote entity table $314_K$, the "seqID" and "URL," field values associated with entity "A" are shown as having been updated. Specifically, the "seqID" is updated to the "seqID" received in the synchronization message from the remote peer (e.g., "4") and the "URL," field value is updated to the URL of the remote peer (e.g., " . . . /clusterN/") that issued the synchronization message.

One or more alerts based at least in part on the synchronization outcomes described in the synchronization message may be generated (step 630). Such alerts might be presented to a user (e.g., a system administrator) in a user interface associated with the source peer and/or the remote peer. For example, if no errors were identified as associated with the synchronization message, a user preference or system preference is used to determine if an alert indicating a successful synchronization of the subject global entity or entities should be generated and presented at one or more user interfaces. In cases when no errors were identified, the alert is not sent. However, if one or more errors were identified (see "Yes" path of decision 626), an alert indicating the type of error (e.g., entity modification conflict, entity write timeout, connection timeout, etc.) might be generated and presented at one or more user interfaces.

The discussions herein describe techniques for invoking a synchronization protocol at any source peer to distribute global entity modifications to one or more remote peers. One use case of the techniques disclosed herein involves synchronization of a disaster recovery policy over multiple clusters. In this use case example, an enterprise might want to establish a disaster recovery policy that is consistent over multiple clusters at multiple geographically disparate sites associated with the enterprise. A disaster recovery policy is a set of information that indicates how one or more disaster recovery operations (e.g., replicate, backup, restore, failover, etc.) are to be carried out after occurrence of an event at a first computing system that raises one or more remediation actions at a second computing system, and as such, the disaster recovery policies at each peer computing system have to be in agreement (e.g., have to be synchronized at certain critical moments in time). For example, a disaster recovery policy might indicate that two identical copies of any block of data at a first computing system are to be replicated as identical blocks of data at a second computing system and also are to be replicated at a third computing system. The disaster recovery policy might further indicate that the checksums of replica blocks are compared as between the peer computing systems. Still further, a disaster recovery policy might indicate the timing of a set of remediation actions that are to be taken by a second computing system upon detection of a failure event at a first computing system.

In many embodiments, a DR policy might be based at least in part on a negotiated service level agreement (SLA), which SLA might specify certain objectives (e.g., recovery point objectives, recovery time objectives, etc.) and/or schedules (e.g., data replication schedules, backup schedules, etc.) as pertains to data protection and/or availability at the enterprise. Whether or not a DR policy has been derived wholly or partially from an SLA, the disaster recovery policy might indicate how synchronization of disaster recovery policies themselves are to be carried out as between two computing systems. An example scenario to illustrate how the herein disclosed techniques can facilitate synchronization of a DR policy over the clusters of the enterprise progresses as follows.

Suppose a first user (e.g., policy administrator) modifies the local instance of the DR policy at a first cluster, while a second user (e.g., a second, different administrator) modifies his or her local instance of the DR policy at a second cluster. According to the herein disclosed techniques, the local instances of the sync tracking data structures at each cluster will be updated and instances of a synchronization protocol will be initiated by each cluster to propagate the local modifications of the DR policy to the other clusters, at which time the modification requests received at each cluster are validated against entity update validation rules.

Specifically, the applied rules detect policy-specific modification conflicts. Alerts corresponding to the particular conflicts are presented to the administrators (e.g., in a user interface) to advise the administrators of the specific characteristics of the detected conflicts. The administrators associated with the conflicting modifications to the DR policy (e.g., the first policy administrator and the second policy administrator) can take action based at least in part on the information provided in the alerts. For example, one of the policy administrators might be authorized to re-initiate the synchronization protocol with a forced synchronization directive (e.g., "forceSync" set to "true") to override any conflicting modifications that might be present. In some cases, rather than provide alerts to the users, the rules applied to the foregoing modification requests might indicate that the modifications from the first user (e.g., the first policy administrator) are to override any modifications associated with other users so that modification conflicts can be resolved without user intervention.

As earlier described, the herein disclosed techniques can facilitate synchronization of global entity modifications over multiple clusters in the presence of one or more failures (e.g., inter-cluster or intra-cluster communication failures) associated with the clusters. One example of a synchronization restoration scenario is disclosed in detail as follows.

Figure 7:
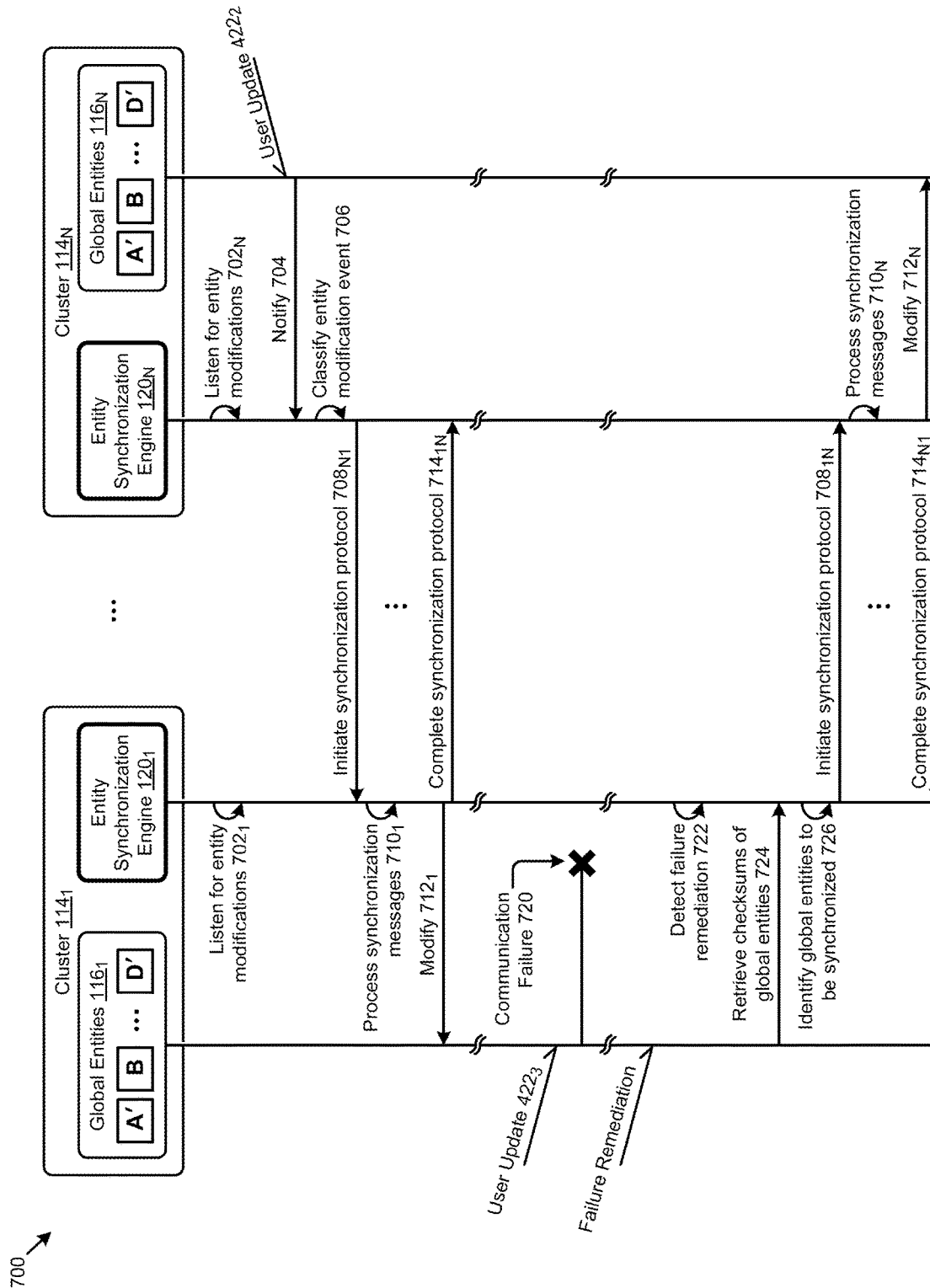
FIG. 7 depicts an example synchronization restoration scenario, according to an embodiment.

FIG. 7 depicts an example synchronization restoration scenario 700. As an option, one or more variations of synchronization restoration scenario 700 or any aspect thereof may be implemented in the context of the architecture and functionality of the embodiments described herein. The synchronization restoration scenario 700 or any aspect thereof may be implemented in any environment.

FIG. 7 illustrates aspects pertaining to invoking a synchronization protocol at any source peer to distribute global entity modifications to one or more remote peers. Specifically, the figure presents certain high order interactions (e.g., operations, messages, etc.) exhibited by instances of various computing components earlier described to illustrate how the herein disclosed techniques can be implemented to maintain synchronization of global entities over multiple clusters even in the presence of failures associated with the clusters. The particular computing components shown in FIG. 7 are cluster $114_1$ comprising entity synchronization engine $120_1$ and global entities $116_1$, and cluster $114_N$ comprising entity synchronization engine $120_N$ and global entities $116_N$.

Synchronization restoration scenario 700 can commence with entity synchronization engines at the clusters each continuously listening for entity modifications (operation $702_1$ and operation $702_N$). At some moment in time, a user update $422_2$ to one of the global entities $116_N$ is performed and entity synchronization engine $120_N$ is notified of the update (message 704). According to the herein disclosed techniques, the entity modification event resulting from user update $422_2$ is classified by invoker (operation 706) and a synchronization protocol is initiated with cluster $114_1$ (message $708_{N1}$). One or more synchronization messages issued in accordance with the synchronization protocol are processed at cluster $114_1$ (operation $710_1$), and one or more of the global entities $116_1$ at cluster $114_1$ are modified (message $712_1$) before the protocol is completed (message $714_{1N}$).

At some later moment in time, a user update $422_3$ to one of the global entities $116_1$ at cluster $114_1$ is performed. In this case, however, a communication failure 720 prevents a notification of the update to be sent to entity synchronization engine $120_1$. When entity synchronization engine $120_1$ detects that the failure has been remediated (operation 722, at some moment after the shown failure remediation event), the checksums of all of the global entities $116_1$ are retrieved (message 724). The retrieved checksums are analyzed to identify the global entities (if any) to be synchronized (operation 726). For example, the retrieved checksums might be compared to a respective set of stored checksums in local instances of sync tracking data structures to identify any global entities that may have been updated (e.g., by user update $422_3$) but not yet synchronized. As illustrated in synchronization restoration scenario 700, at least one global entity shared with cluster $114_N$ is identified for synchronization. As such, a synchronization protocol is initiated with cluster $114_N$ (message $708_{1N}$). One or more synchronization messages issued in accordance with the synchronization protocol are processed at cluster $114_N$ (operation $710_N$), and one or more of the global entities $116_N$ at cluster $114_N$ are modified (message $712_N$) before the protocol is completed (message $714_{N1}$). As facilitated by the herein disclosed techniques, the synchronization of a global entity modified by user update $422_3$ prior to communication failure 720 is automatically restored over cluster $114_1$ and cluster $114_N$ upon remediation of the failure.

ADDITIONAL EMBODIMENTS OF THE DISCLOSURE

Additional Practical Application Examples

Figure 8A:
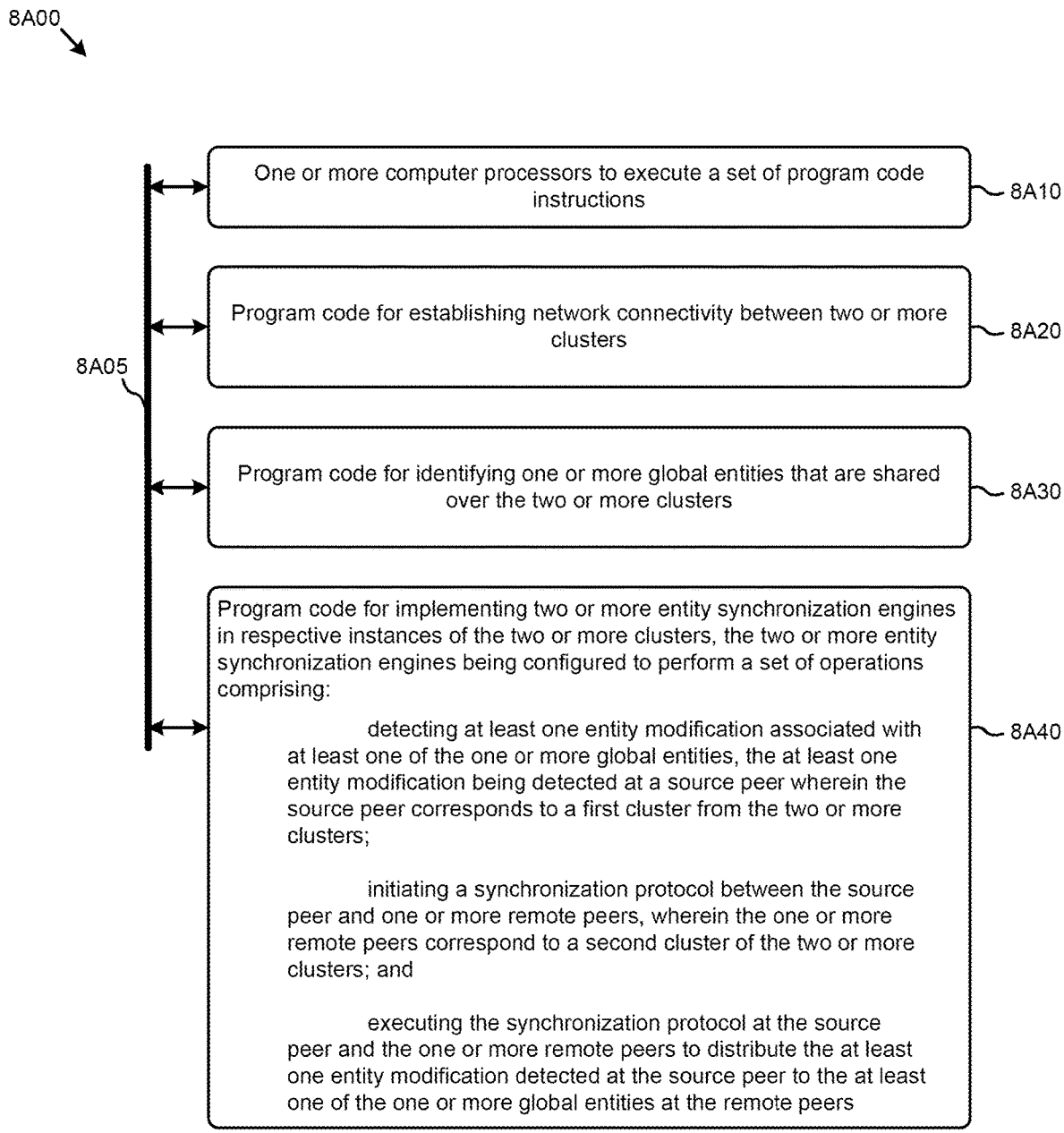
FIG. 8A and FIG. 8B depict system components as arrangements of computing modules that are interconnected so as to implement certain of the herein-disclosed embodiments.

FIG. 8A depicts a system 8A00 as an arrangement of computing modules that are interconnected so as to operate cooperatively to implement certain of the herein-disclosed embodiments. This and other embodiments present particular arrangements of elements that, individually or as combined, serve to form improved technological processes that address maintaining shared data items over multiple geographically disparate computing systems in the presence of failures at the computing systems. The partitioning of system 8A00 is merely illustrative and other partitions are possible. As an option, the system 8A00 may be implemented in the context of the architecture and functionality of the embodiments described herein. Of course, however, the system 8A00 or any operation therein may be carried out in any desired environment.

The system 8A00 comprises at least one processor and at least one memory, the memory serving to store program instructions corresponding to the operations of the system. As shown, an operation can be implemented in whole or in part using program instructions accessible by a module. The modules are connected to a communication path 8A05, and any operation can communicate with any other operations over communication path 8A05. The modules of the system can, individually or in combination, perform method operations within system 8A00. Any operations performed within system 8A00 may be performed in any order unless as may be specified in the claims.

The shown embodiment implements a portion of a computer system, presented as system 8A00, comprising one or more computer processors to execute a set of program code instructions (module 8A10) and modules for accessing memory to hold program code instructions to perform steps for global entity distribution, the steps comprising: establishing network connectivity between two or more clusters (module 8A20); identifying one or more global entities that are shared over the two or more clusters (module 8A30); implementing two or more entity synchronization engines in respective instances of the two or more clusters, the two or more entity synchronization engines being configured to perform a set of operations comprising: detecting at least one entity modification associated with at least one of the one or more global entities, the at least one entity modification being detected at a source peer wherein the source peer corresponds to a first cluster from the two or more clusters; initiating a synchronization protocol between the source peer and one or more remote peers, wherein the one or more remote peers correspond to a second cluster of the two or more clusters; and executing the synchronization protocol at the source peer and the one or more remote peers to distribute the at least one entity modification detected at the source peer to the at least one of the one or more global entities at the remote peers (module 8A40).

Variations of the foregoing may include more or fewer of the shown modules. Certain variations may perform more or fewer (or different) steps and/or certain variations may use data elements in more or in fewer or in different operations. Strictly as examples, the set of operations may further comprise identifying one or more conflicts associated with the at least one entity modification and issuing one or more alert based on the one or more identified conflicts. The operations may further comprise issuing a first synchronization message from the source peer, receiving the first synchronization message at the one or more remote peers, and issuing a second synchronization message from at least one of the one or more remote peers to the source peer.

In some embodiments, the set of operations further comprise validating the first synchronization message and/or the second synchronization message, wherein validating the synchronization messages, includes applying a set of business logic rules to the content of the synchronization messages.

In some embodiments, one or more data structures store one or more attributes associated with at least one of, an entity identifier, an entity type, an entity name, a checksum, a sequence identifier, a local synchronization status, a remote synchronization status, or a remote peer URL. A given remote peer may be situated a cluster that is in a different availability zone than any source peer.

Still further, some embodiments include variations in the order of the operations performed, and some embodiments include variations of representation and storage of the data elements used in the operations.

Figure 8B:
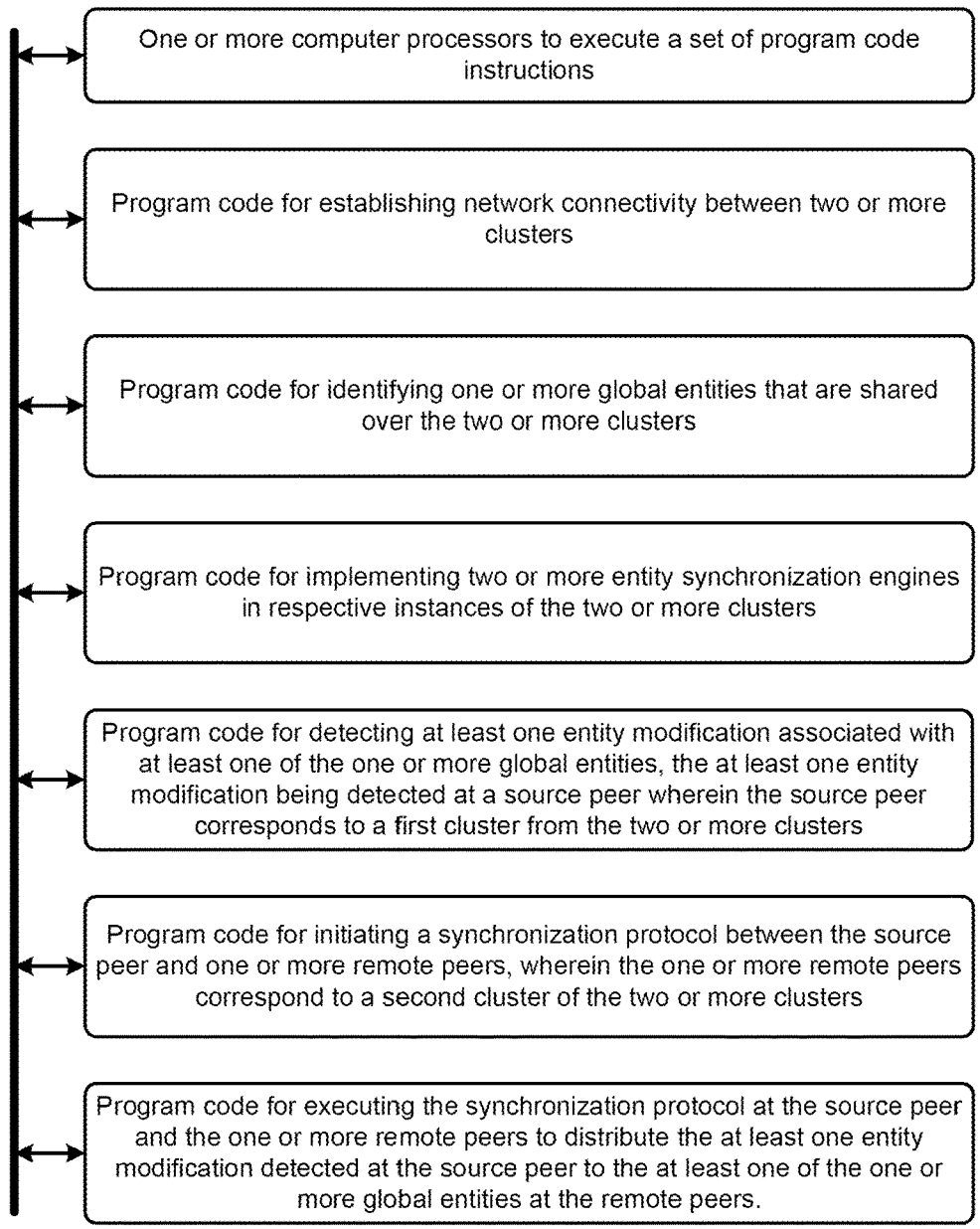

FIG. 8B depicts a system 8B00 as an arrangement of computing modules that are interconnected so as to operate cooperatively to implement certain of the herein-disclosed embodiments. The partitioning of system 8B00 is merely illustrative and other partitions are possible.

SYSTEM ARCHITECTURE OVERVIEW

Additional System Architecture Examples

Figure 9A:
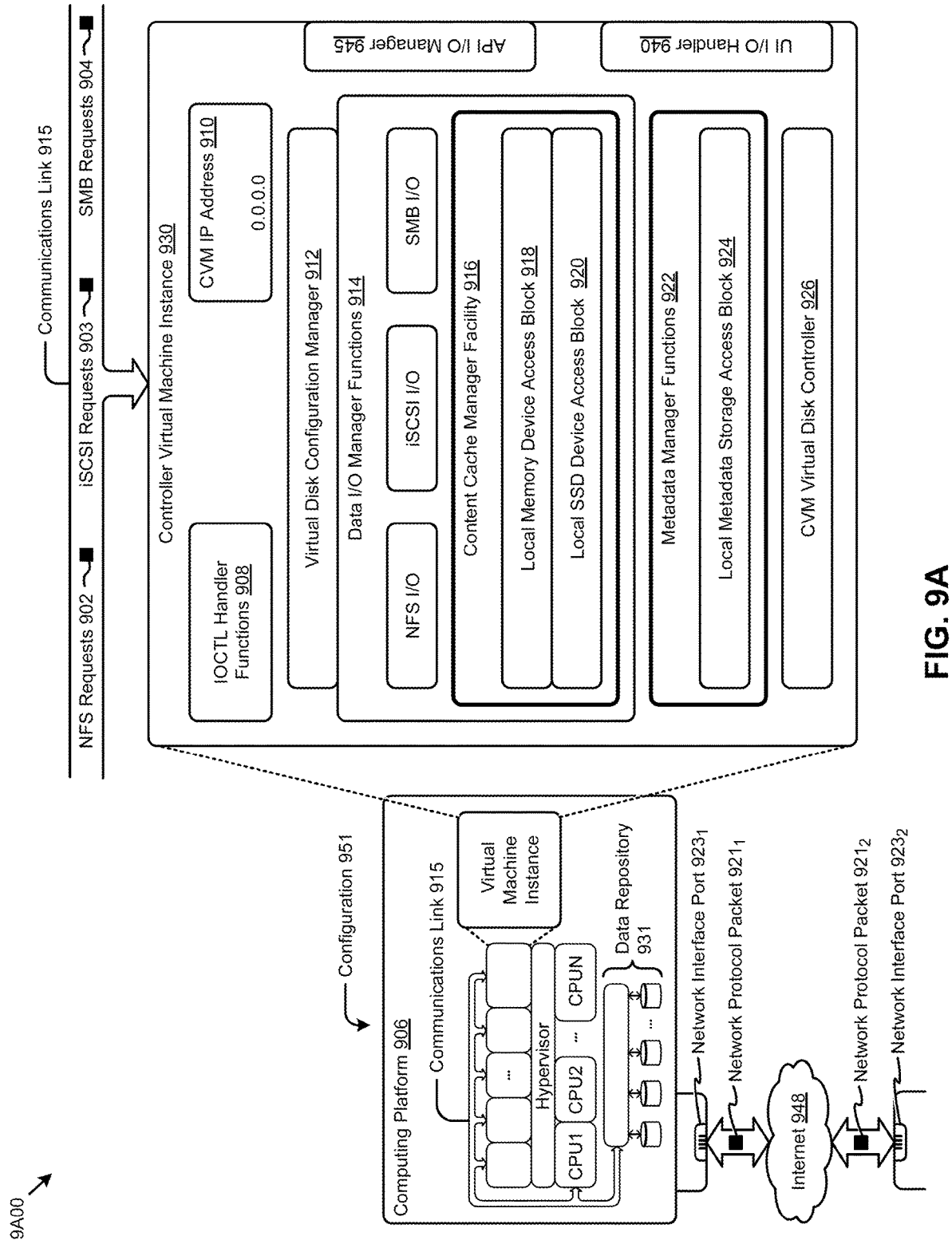
FIG. 9A, FIG. 9B, and FIG. 9C depict virtualized controller architectures comprising collections of interconnected components suitable for implementing embodiments of the present disclosure and/or for use in the herein-described environments.

FIG. 9A depicts a virtualized controller as implemented by the shown virtual machine architecture 9A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 9A00 comprises a collection of interconnected components suitable for implementing embodiments of the present disclosure and/or for use in the herein-described environments. Moreover, virtual machine architecture 9A00 includes a virtual machine instance in configuration 951 that is further described as pertaining to controller virtual machine instance 930. Configuration 951 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 930.

In this and other configurations, a controller virtual machine instance receives block I/O storage requests as network file system (NFS) requests in the form of NFS requests 902, and/or internet small computer storage interface (iSCSI) block IO requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output can be handled by one or more IO control handler functions (e.g., IOCTL handler functions 908) that interface to other functions such as data IO manager functions 914 and/or metadata manager functions 922. As shown, the data IO manager functions can include communication with virtual disk configuration manager 912 and/or can include direct or indirect communication with any of various block IO functions (e.g., NFS IO, iSCSI IO, SMB IO, etc.).

In addition to block IO functions, configuration 951 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through API IO manager 945.

Communications link 915 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 930 includes content cache manager facility 916 that accesses storage locations, possibly including local dynamic random access memory (DRAM) (e.g., through local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 931, which in turn can be formatted into any one or more storage areas, and which can comprise parameterized storage accessible by a key (e.g., a filename, a table name, a block address, an offset address, etc.). Data repository 931 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 924. The data repository 931 can be configured using CVM virtual disk controller 926, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 951 can be coupled by communications link 915 (e.g., backplane, LAN, PSTN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port $923_1$ and network interface port $923_2$). Configuration 951 can be addressed through one or more network interface ports using an IP address. Any operational element within computing platform 906 can perform sending and receiving operations using any of a range of network protocols, possibly including network protocols that send and receive packets (e.g., network protocol packet $921_1$ and network protocol packet $921_2$).

Computing platform 906 may transmit and receive messages that can be composed of configuration data and/or any other forms of data and/or instructions organized into a data structure (e.g., communications packets). In some cases, the data structure includes program code instructions (e.g., application code) communicated through the Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or the results of executing program code can be delivered to a particular user via a download (e.g., a download from computing platform 906 over the Internet 948 to an access device).

Configuration 951 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to peer-to-peer synchronization of global entities over multiple clusters. In some embodiments, a module may include one or more state machines and/or combinational logic used to implement or facilitate the operational and/or performance characteristics pertaining to peer-to-peer synchronization of global entities over multiple clusters.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of peer-to-peer synchronization of global entities over multiple clusters). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to peer-to-peer synchronization of global entities over multiple clusters, and/or for improving the way data is manipulated when performing computerized operations pertaining to invoking a synchronization protocol at any source peer to distribute global entity modifications to one or more remote peers.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 9B:
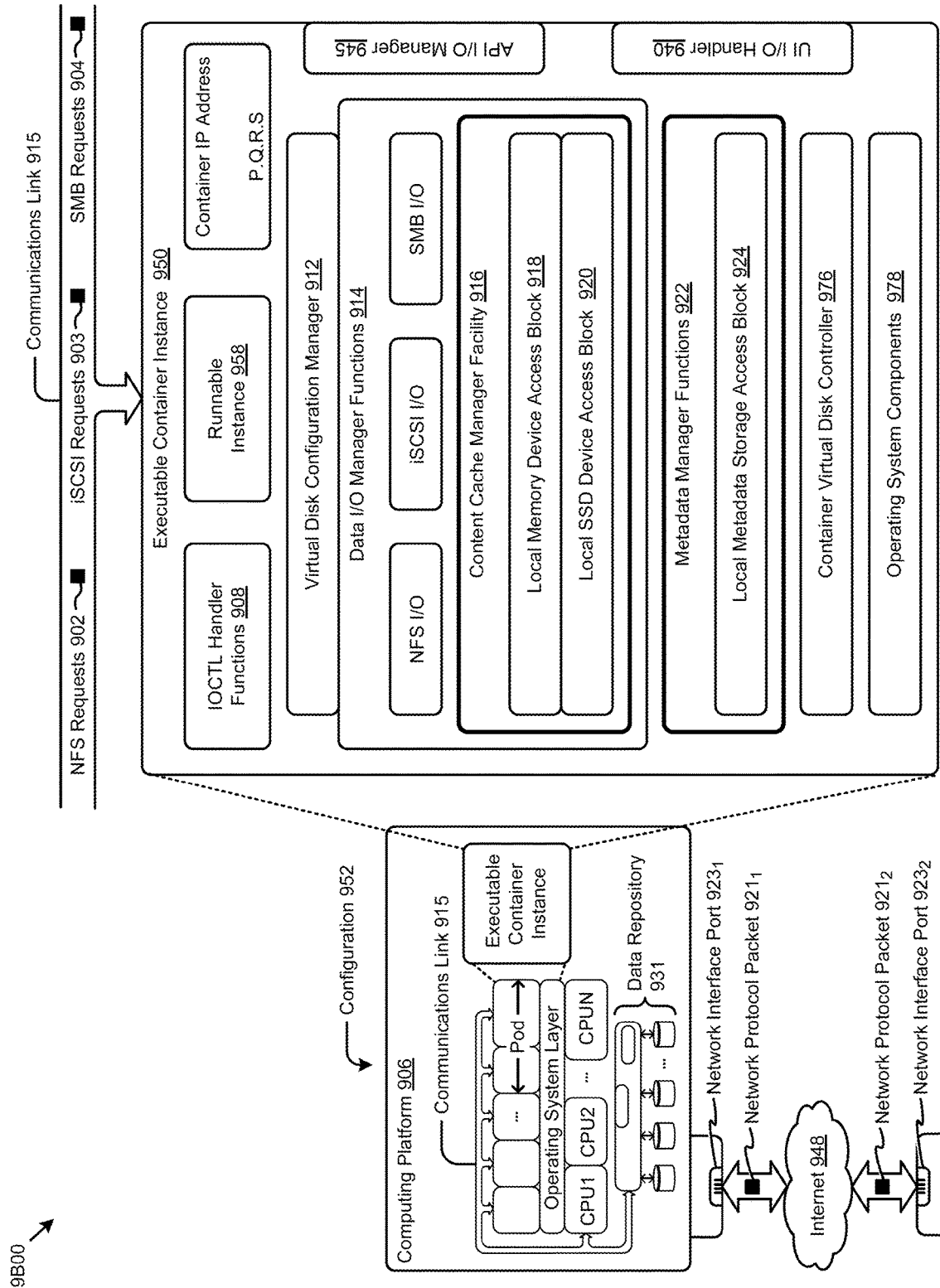

FIG. 9B depicts a virtualized controller implemented by containerized architecture 9B00. The containerized architecture comprises a collection of interconnected components suitable for implementing embodiments of the present disclosure and/or for use in the herein-described environments. Moreover, the shown containerized architecture 9B00 includes an executable container instance in configuration 952 that is further described as pertaining to executable container instance 950. Configuration 952 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 950). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls -a", etc.). The executable container might optionally include operating system components 978, however such a separate set of operating system components need not be provided. As an alternative, an executable container can include runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
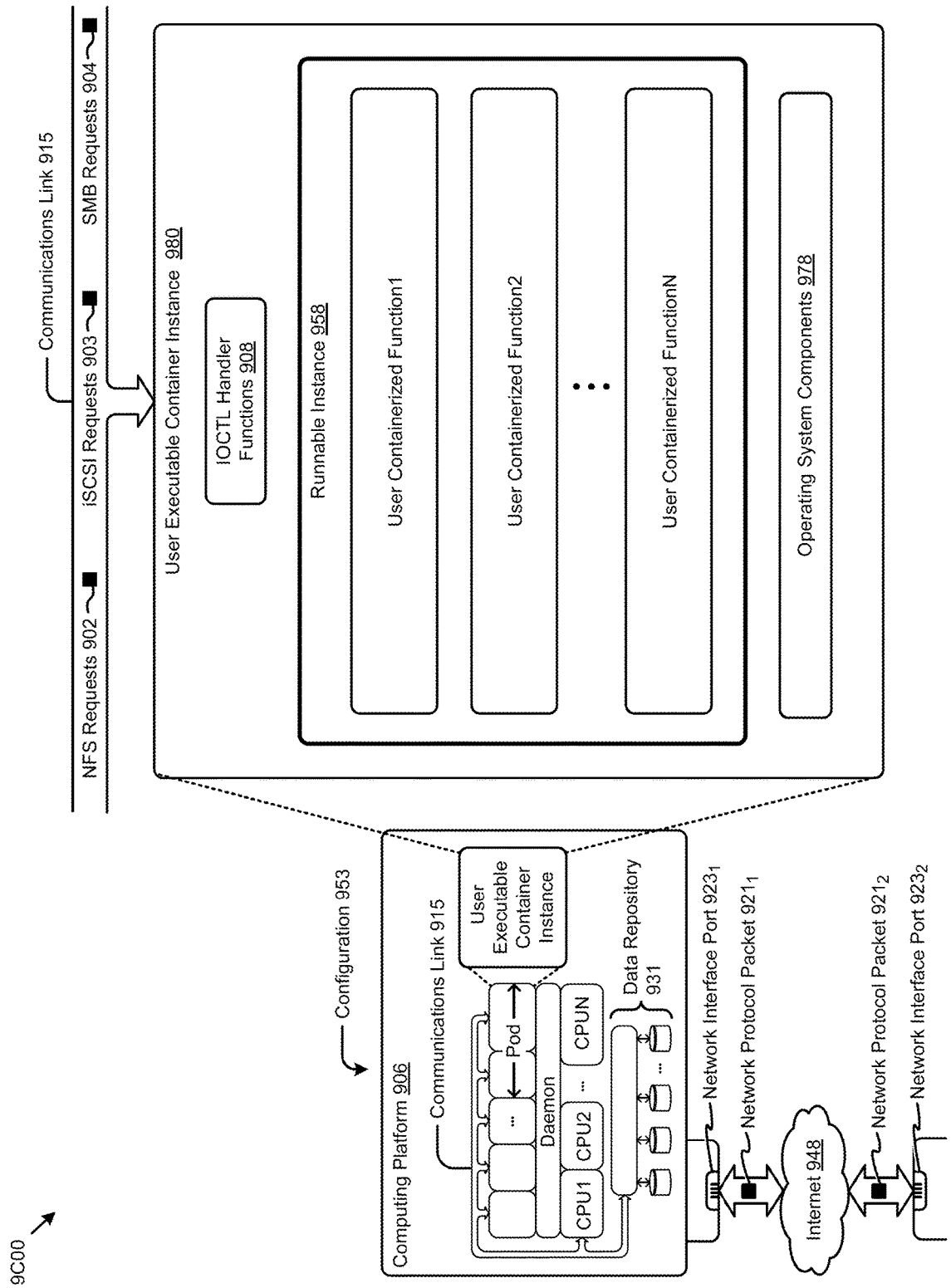

FIG. 9C depicts a virtualized controller implemented by a daemon-assisted containerized architecture 9C00. The containerized architecture comprises a collection of interconnected components suitable for implementing embodiments of the present disclosure and/or for use in the herein-described environments. Moreover, the shown daemon-assisted containerized architecture includes a user executable container instance in configuration 953 that is further described as pertaining to user executable container instance 980. Configuration 953 includes a daemon layer (as shown) that performs certain functions of an operating system.

User executable container instance 980 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 958). In some cases, the shown operating system components 978 comprise portions of an operating system, which portions are interfaced with or included in the runnable instance and/or any user containerized functions. In this embodiment of a daemon-assisted containerized architecture, the computing platform 906 might or might not host operating system components other than operating system components 978. More specifically, the shown daemon might or might not host operating system components other than operating system components 978 of user executable container instance 980.

The virtual machine architecture 9A00 of FIG. 9A and/or the containerized architecture 9B00 of FIG. 9B and/or the daemon-assisted containerized architecture 9C00 of FIG. 9C can be used in any combination to implement a distributed platform that contains multiple servers and/or nodes that manage multiple tiers of storage where the tiers of storage might be formed using the shown data repository 931 and/or any forms of network accessible storage. As such, the multiple tiers of storage may include storage that is accessible over communications link 915. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 951 of FIG. 9A) to manage the interactions between the underlying hardware and user virtual machines or containers that run client software.

Distinct from user virtual machines or user executable containers, a special controller virtual machine (e.g., as depicted by controller virtual machine instance 930) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor causes a set of acts for managing a policy applied at two different clusters of a distributed computing system, the set of acts comprising:

receiving, at a first node in a first cluster of a distributed computing system, an input from a first user representing a modification of a policy, wherein the distributed computing system comprises the first cluster and a second cluster, the first cluster comprising a first plurality of nodes including at least the first node, the second cluster comprising a second plurality of nodes including at least a second node, and the first and second clusters apply the policy to at least a second user;

updating, by the first node, a first version of the policy at the first cluster based on the received input from the first user;

identifying, by the first node, a peer at the second cluster corresponding to the policy;

transmitting, by the first node, a first peer-to-peer synchronization message to the second node in the second cluster using a peer-to-peer synchronization protocol, wherein the first peer-to-peer synchronization message represents the modification of the policy;

receiving, by the first node, a second peer-to-peer synchronization message representing the modification of the policy from the second node; and updating, by the first node, a second version of the policy at the first cluster based on the second peer-to-peer synchronization message from the second node.

2. The non-transitory computer readable medium of claim 1, wherein the set of acts further comprise identifying a conflict associated with the modification of the policy.

3. The non-transitory computer readable medium of claim 1, wherein one or more data structures store one or more attributes associated with at least one of, an entity identifier, an entity type, an entity name, a checksum, a sequence identifier, a local synchronization status, a remote synchronization status, or a remote peer URL.

4. The non-transitory computer readable medium of claim 3, wherein a first data structure of the one or more data structures comprise a local entity data table representing at least the local synchronization status for one or more policies.

5. The non-transitory computer readable medium of claim 4, wherein a second data structure of the one or more data structures comprise a remote entity data table representing at least the remote synchronization status for one or more policies.

6. The non-transitory computer readable medium of claim 5, wherein identifying, by the first node, a peer at the second cluster corresponding to the policy comprises at least accessing the second data structure to identify a peer that shares the policy.

7. The non-transitory computer readable medium of claim 1, wherein an entity modification is classified based at least in part on a checksum associated with a policy.

8. The non-transitory computer readable medium of claim 1, wherein an entity modification corresponds to an entity create operation, an entity update operation, or an entity delete operation.

9. A method for managing a policy applied at two different clusters of a distributed computing system comprising:
receiving, at a first node in a first cluster of a distributed computing system, an input from a first user representing a modification of a policy, wherein the distributed computing system comprises the first cluster and a second cluster, the first cluster comprising a first plurality of nodes including at least the first node, the second cluster comprising a second plurality of nodes including at least a second node, and the first and second clusters apply the policy to at least a second user;
updating, by the first node, a first version of the policy at the first cluster based on the received input from the first user;
identifying, by the first node, a peer at the second cluster corresponding to the policy;
transmitting, by the first node, a peer-to-peer synchronization message to the second node in the second cluster using a peer-to-peer synchronization protocol, wherein the peer-to-peer synchronization message represents the modification of the policy;
receiving, by the second node, the peer-to-peer synchronization message representing the modification of the policy from the first node; and
updating, by the second node, a second version of the policy at the second cluster based on the peer-to-peer synchronization message from the first node.

10. The method of claim 9, further comprising identifying a conflict associated with the modification of the policy.

11. The method of claim 9, wherein one or more data structures store one or more attributes associated with at least one of, an entity identifier, an entity type, an entity name, a checksum, a sequence identifier, a local synchronization status, a remote synchronization status, or a remote peer URL.

12. The method of claim 11, wherein a first data structure of the one or more data structures comprise a local entity data table representing at least the local synchronization status for one or more policies.

13. The method of claim 12, wherein a second data structure of the one or more data structures comprise a remote entity data table representing at least the remote synchronization status for one or more policies.

14. The method of claim 13, wherein identifying, by the first node, a peer at the second cluster corresponding to the policy comprises at least accessing the second data structure to identify a peer that shares the policy.

15. The method of claim 9, wherein an entity modification is classified based at least in part on a checksum associated with a policy.

16. The method of claim 9, wherein an entity modification corresponds to an entity create operation, an entity update operation, or an entity delete operation.

17. A computing system for managing a policy applied at two different clusters of a distributed computing system, comprising:
a first node having a first memory storing a first set of instructions and a first processor for performing a first set of acts, the first set of acts comprising:
receiving, at a first node in a first cluster of a distributed computing system, an input from a first user representing a modification of a policy, wherein the distributed computing system comprises the first cluster and a second cluster, the first cluster comprising a first plurality of nodes including at least the first node, the second cluster comprising a second plurality of nodes including at least a second node, and the first and second clusters apply the policy to at least a second user;
updating, by the first node, a first version of the policy at the first cluster based on the received input from the first user;
identifying, by the first node, a peer at the second cluster corresponding to the policy; and
transmitting, by the first node, a peer-to-peer synchronization message to the second node in the second cluster using a peer-to-peer synchronization protocol, wherein the peer-to-peer synchronization message represents the modification of the policy; and
the second node having a second memory storing a second set of instructions and a second processor for performing a second set of acts, the second set of acts comprising:
receiving, by the second node, the peer-to-peer synchronization message representing the modification of the policy from the first node; and
updating, by the second node, a second version of the policy at the second cluster based on the peer-to-peer synchronization message from the first node.

18. The computing system of claim 17, further comprising identifying a conflict associated with the modification of the policy.

19. The computing system of claim 17, wherein one or more data structures store one or more attributes associated with at least one of, an entity identifier, an entity type, an entity name, a checksum, a sequence identifier, a local synchronization status, a remote synchronization status, or a remote peer URL.

20. The computing system of claim 19, wherein a first data structure of the one or more data structures comprise a local entity data table representing at least the local synchronization status for one or more policies.

21. The computing system of claim 20, wherein a second data structure of the one or more data structures comprise a remote entity data table representing at least the remote synchronization status for one or more policies.

22. The computing system of claim 21, wherein identifying, by the first node, a peer at the second cluster corresponding to the policy comprises at least accessing the second data structure to identify a peer that shares the policy.

23. The computing system of claim 17, wherein an entity modification is classified based at least in part on a checksum associated with a policy.

24. The computing system of claim 17, wherein an entity modification corresponds to an entity create operation, an entity update operation, or an entity delete operation.

* * * * *